United States Patent [19]

McMahan et al.

[11] Patent Number: 5,771,365
[45] Date of Patent: Jun. 23, 1998

[54] CONDENSED MICROADDRESS GENERATION IN A COMPLEX INSTRUCTION SET COMPUTER

[75] Inventors: Steven C. McMahan, Richardson; Mark W. Bluhm, Plano, both of Tex.

[73] Assignee: Cyrix Corporation, Richardson, Tex.

[21] Appl. No.: 396,857

[22] Filed: Mar. 1, 1995

Related U.S. Application Data

[63] Continuation-in-part of Ser. No. 138,855, Oct. 18, 1993, Pat. No. 5,644,741, and a continuation-in-part of Ser. No. 138,320, Oct. 18, 1993, abandoned, and a continuation-in-part of Ser. No. 138,660, Oct. 18, 1993, abandoned.

[51] Int. Cl.[6] ................................................ G06F 12/02
[52] U.S. Cl. .......................................................... 395/381
[58] Field of Search ...................... 395/DIG. 1 MS File, 395/DIG. 2 MS File, 401, 427, 428, 429, 410, 412, 376, 384, 800, 800.01, 800.23, 800.32, 800.41, 381, 390, 1, 2, 5, 100, 154, 200, 201, 202, 212, 214, 215, 220

[56] References Cited

U.S. PATENT DOCUMENTS 5,032,983  7/1991  Fu et al. .................................. 395/376
5,390,311  2/1995  Fu et al. ............................. 395/421.05

*Primary Examiner*—Robert B. Harrell
*Attorney, Agent, or Firm*—Andrew S. Viger; John L. Maxin

[57] ABSTRACT

A microarchitecture in a complex instruction computer system is disclosed employing a sparse microROM array and concatenation address circuitry for forming microaddress entry points, avoiding the need for a programmable logic array to translate instruction opcodes and avoiding duplicative entry points, thus minimizing the microROM array size.

8 Claims, 10 Drawing Sheets

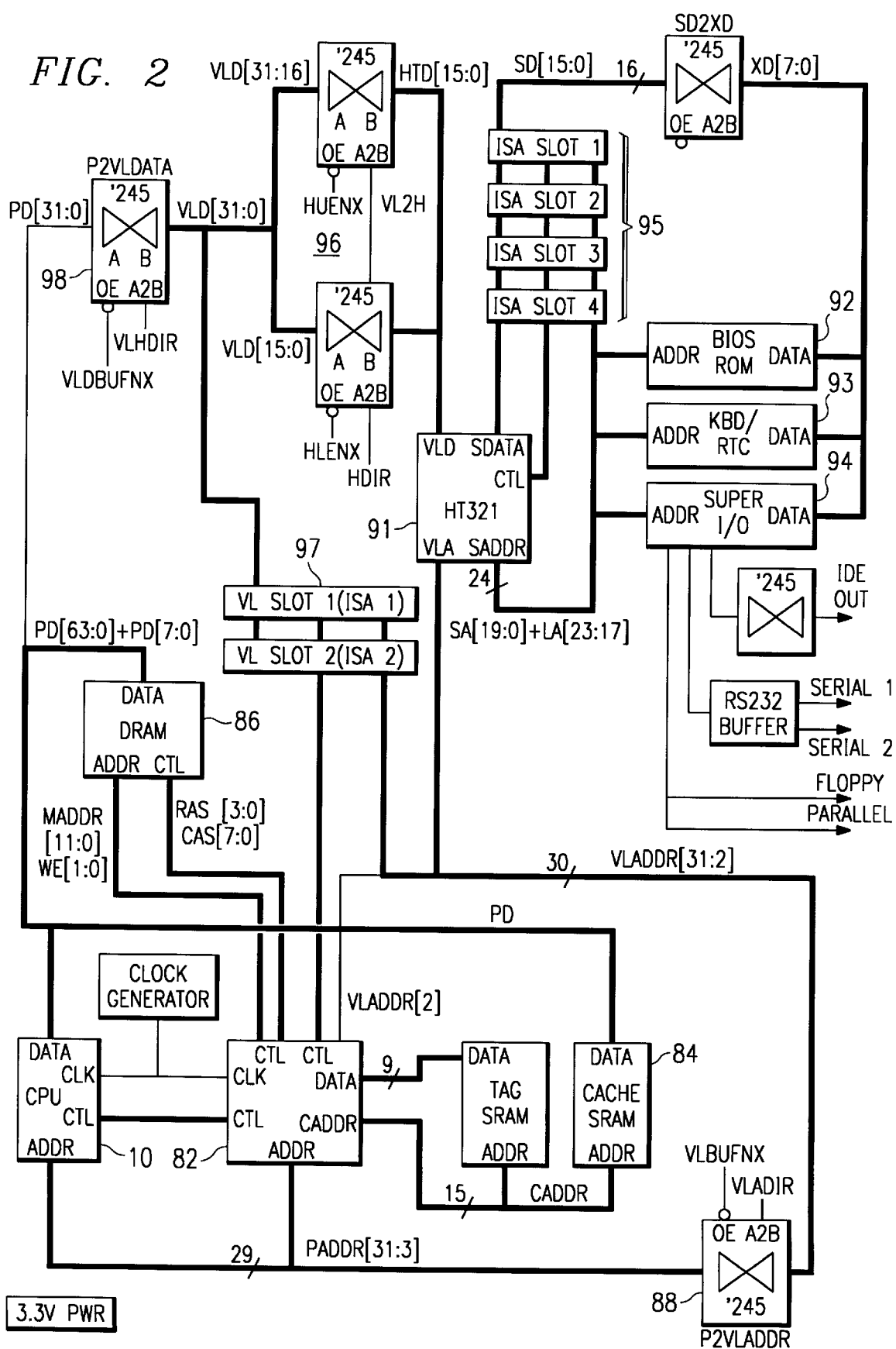

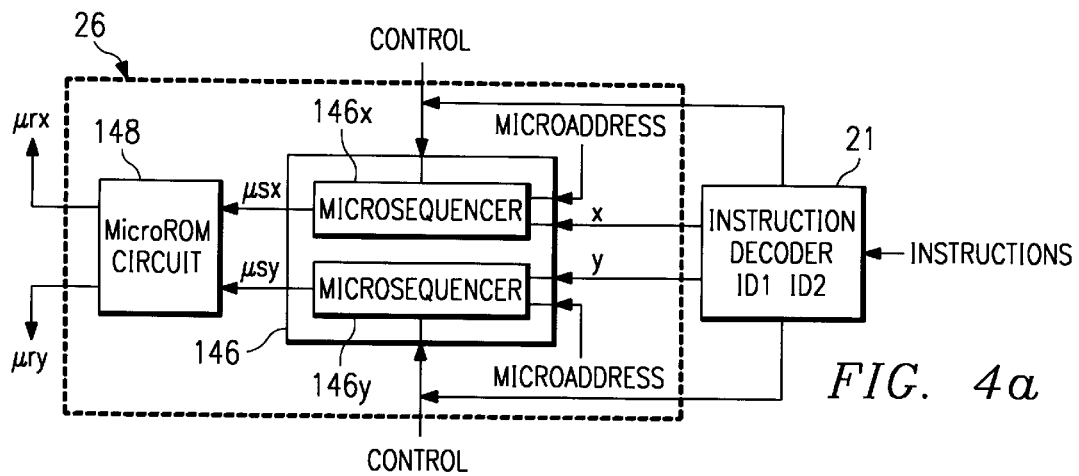
FIG. 4a
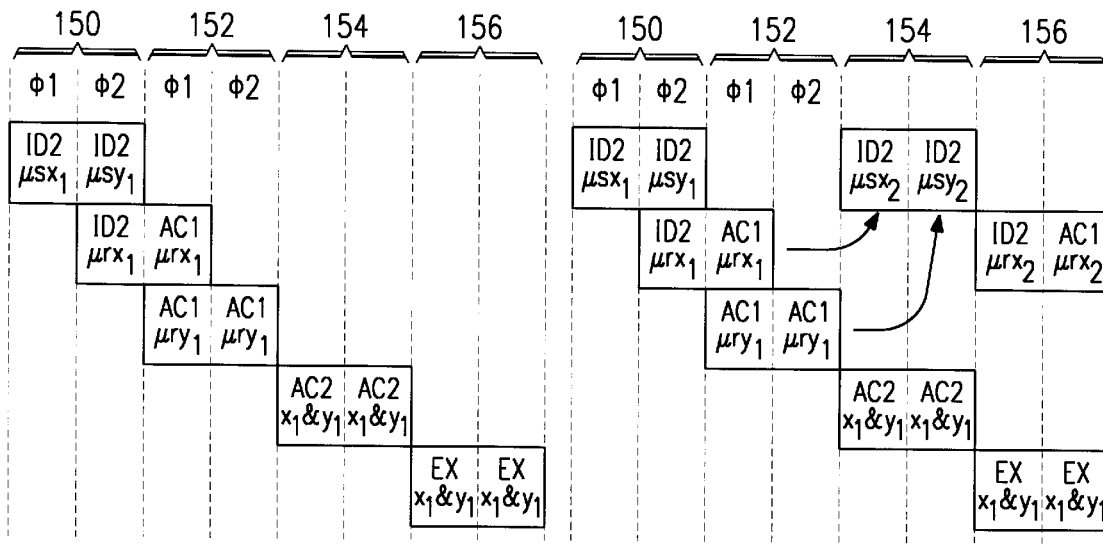
FIG. 4b
FIG. 4d
(PRIOR ART)
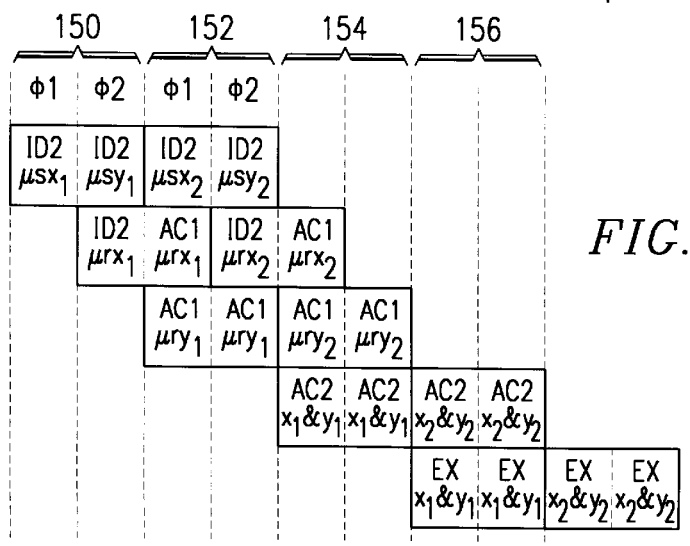
FIG. 4c

CONDENSED MICROADDRESS GENERATION IN A COMPLEX INSTRUCTION SET COMPUTER

CROSS-REFERENCES TO RELATED APPLICATIONS:

This patent is a continuation-in-part of co-pending and commonly assigned U.S. patent applications Ser. No. 08/138,855 filed Oct. 18,1993,now U.S. Pat. No. 5,644,741, entitled "Microprocessor Having Single Clock Instruction Decode Architecture", Ser. No. 08/138,320, now abandoned, entitled "Microprocessor Having Single MicroROM Operation For Supporting Dual Pipeline Architecture", and Ser. No. 08/138,660, now abandoned entitled "Microprocessor Having Expedited Execution Of Condition Dependent Instructions", all concurrently filed on Oct. 18, 1993.

BACKGROUND OF THE INVENTION:

1. Field Of The Invention:

This invention relates generally to microprocessors, and more particularly to condensed entry point address generation for a control store memory to access a sequence of microinstructions defining a machine instruction.

2. Description Of Related Art:

In the design of a microprocessor, instruction throughput, i.e., the number of instructions executed per second, is of primary importance. The number of machine instructions executed per second may be increased by various means. The most straightforward technique for increasing machine instruction throughput is by increasing frequency at which the microprocessor operates. Increased operating frequency, however, is limited by fabrication techniques and also results in the generation of excess heat.

Thus, modern day microprocessor designs are focusing on increasing the machine instruction throughput by using design techniques which increase the average number of machine instructions executed per clock cycle period. One such technique for increasing machine instruction throughput is "pipelining." Pipelining techniques segment each machine instruction flowing through the microprocessor into several portions, each of which can be handled by a separate stage in the pipeline. Pipelining increases the speed of a microprocessor by overlapping multiple machine instructions in execution. For example, if each machine instruction could be executed in six stages, and each stage required one clock cycle to perform its function, six separate machine instructions could be simultaneously executed (each executing in a separate stage of the pipeline) such that one machine instruction was completed on each clock cycle. In this ideal scenario, the pipelined architecture would have an machine instruction throughput which was six times greater than the non-pipelined architecture, which could complete one machine instruction every six clock cycles.

A second technique for increasing the speed of a microprocessor is by designing it to be a "superscalar." In a superscalar architecture, more than one machine instruction is issued per clock cycle. If no machine instructions were dependent upon other machine instructions in the flow, the increase in machine instruction throughput would be proportional to the degree of scaleability. Thus, if an architecture were superscalar to degree 2 (meaning that two machine instructions issued upon each clock cycle), then the machine instruction throughput in the machine would double.

A microprocessor may be both superpipelined (an instruction pipeline with many stages is referred to as "superpipelined") and superscalar to achieve a high instruction throughput. However, the operation of such a system in practice is far from the ideal situation where each instruction can be neatly executed in a given number of pipe stages and where the execution of instructions is not interdependent. In actual operation, instructions have varying resource requirements, thus creating interruptions in the flow of instructions through the pipeline. Further, the instructions typically have interdependencies; for example, an instruction which reads the value of a register is dependent on a previous instruction which writes the value to that same register the second instruction cannot execute until the first instruction has completed its write to the register.

By way of further background, the execution of a machine instruction in a complex instruction set computer (CISC) is typically broken down into a "micro-sequence" of two or more microinstructions, collectively referred to as a "microprogram" or "microcode". Microcode is usually stored in a small, high speed, nonvolatile memory separate from main memory, commonly referred to as a "control store" memory or a "microROM". The so-called microROM is generally a linear memory array organized with contiguous address space addressable by address decode logic circuitry.

In its most simplest form, the starting or "entry point" into the micro-sequence for a particular CISC instruction is defined by decoding its opcode, source, and destination fields with a so-called Programmable Logic Array (a.k.a. PLA). The PLA is required in part, to reduce the instruction length to match the address field length of the microROM or alternatively, a microROM is employed having an address space larger than necessary in order to match the instruction length resulting in excessive power consumption and wasted die space.

The generation of the "entry" point into the micro-sequence is usually much more complex requiring not only the instruction fields as inputs to the PLA, but also among other things, instruction length, addressing mode, and operand type. Multiple mode instructions, typically defined by adjacent opcodes, such as for example the X86 ADD: register-register, register-memory, memory-register, immediate-register/memory, and immediate-accumulator, have required a PLA to generate multiple entry points into the same general micro-sequence in the microROM. Complicating the issue even further is that the optimum length of a microcode address is usually variable. For instance, in the X86 architecture the optimum length depends on, inter alia, whether the protected mode is enabled, the source of the operands, or the presence of a repeat prefix.

Consequently, the use of a PLA to reduce and translate the instruction into multiple microcode entry points ordinarily requires an additional stage in a pipelined processor thus adding an additional clock cycle to each instruction. It can be appreciated therefore, that the PLA required for decoding the different instructions is necessarily large, increasing cost, power consumption, and access time. Moreover in a superscalar microprocessor, the attendant drawbacks of instruction decoding with a PLA are even further exacerbated since the PLA must be duplicated for each execution pipe. Similarly, the use of a microROM with a larger than necessary address space is inefficient and suffers from essentially the same drawbacks as using a large PLA.

Accordingly, there is a compelling need for a microprocessor microarchitecture which can decode CISC instructions and can generate microROM address entry points without the need for large PLAs or large microROMs.

SUMMARY OF THE INVENTION

To overcome the limitations in the prior art described above, and to overcome other limitations that will become apparent upon reading and understanding the present specification, the present invention discloses a sparse array microROM and address entry point generation circuitry for addressing M-bits of non contiguous address space with N address bits, wherein N is larger M. The address entry point generation circuitry concatenates selected information fields within the microprocessor to form a full-length microaddress to address the sparse array without the need for a programmable logic array to decode and translate instructions into microcode entry points. Modified instruction opcodes directly address microcode entry points in the sparse array without sacrificing small microROM size.

A feature of the present invention is the elimination of a large programmable logic array to decode and match instruction lengths to the microROM address field.

Other features include reduced size, cost, and power consumption, and increased operational speed due to the elimination of the programmable logic array and the reduced microROM array size.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of systems and methods in accordance with the present invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1b illustrates a generalized block diagram of the instruction pipeline stages of the microprocessor depicted in Figure 1a;

FIG. 2 illustrates a block diagram of a system using the microprocessor of Figure 1a;

FIG. 4a illustrates a simplified block diagram of an instruction decoder and a microcontrol unit for the microprocessor in FIG. 1a;

FIG. 4b illustrates a timing diagram showing the generation of a microaddress and the resultant microinstruction output from the microcontrol unit depicted in FIG. 4a;

FIG. 4c illustrates a preferred timing diagram of one aspect of the present invention in generating a microinstruction and obtaining the next successive microaddress;

FIG. 4d illustrates a prior art timing diagram of a wasted clock cycle between generation of a microinstruction and obtaining the next successive microaddress;

FIG. 5 illustrates a more detailed block diagram of the instruction decoder and the microcontrol unit depicted in FIG. 4a;

DETAILED DESCRIPTION OF THE PREFERRED EMBODIMENT

The detailed description of an exemplary embodiment of the microprocessor of the present invention is organized as follows:

1. Exemplary Processor System 1.1. Microprocessor. 1.2. System

2. Generalized Pipeline Architecture

3. Single Clock Instruction Decode

4. Single MicroROM Operation For Supporting Dual Pipeline Architecture

5. Expediting Execution Of Change Of Flow Instructions

6. Microarchitecture Without Large PLA Decoder 6.1 Sparse MicroROM Array 6.2 Address Entry Point Generation 7. Conclusion This organizational table, and the corresponding headings used in this detailed description, are provided for the convenience of reference only. Detailed description of conventional or known aspects of the microprocessor are omitted as to not obscure the description of the invention with unnecessary detail.

1. Exemplary Processor System

Figure 1A:
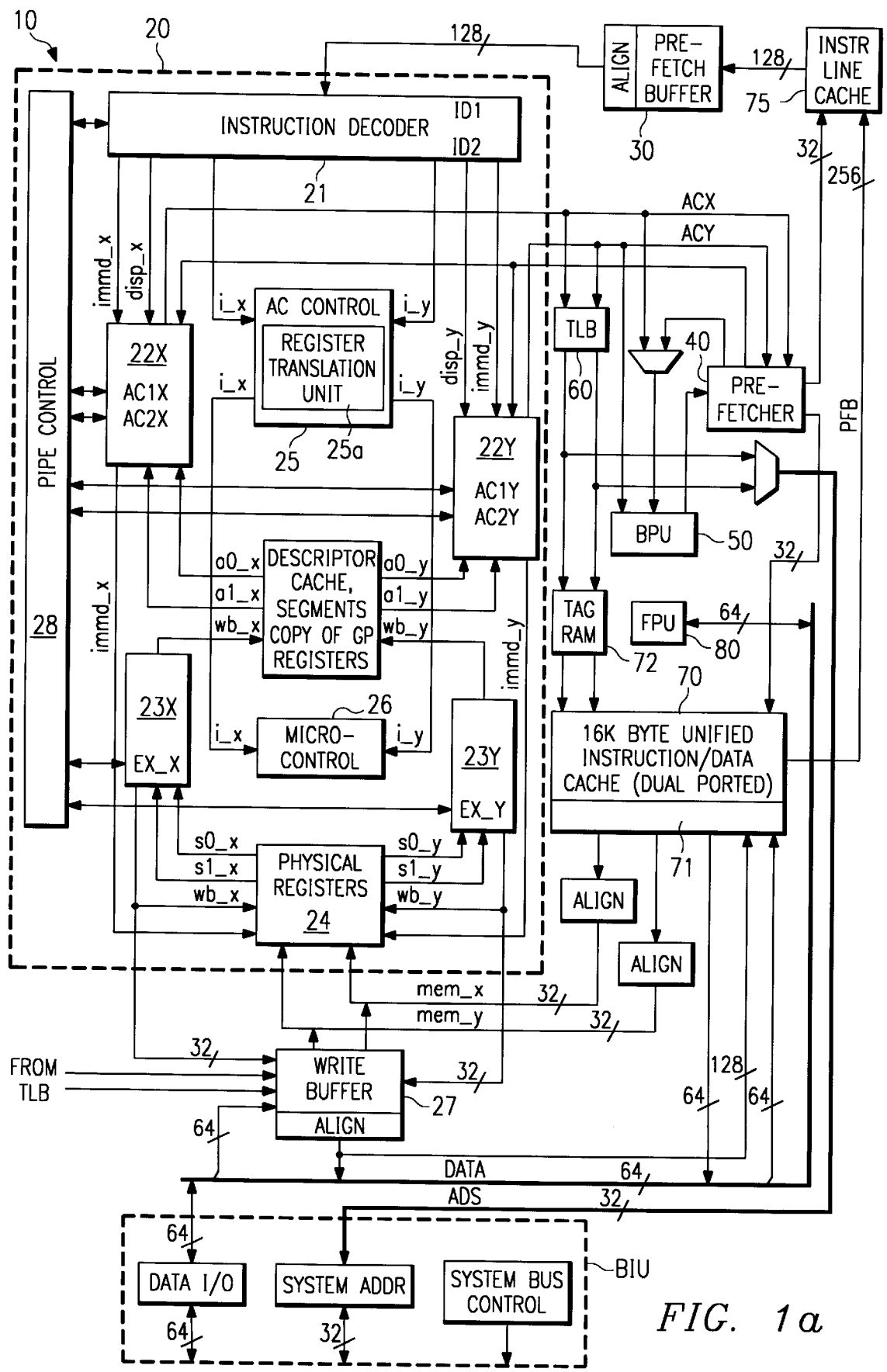
FIG. 1a illustrates a block diagram of a microprocessor practiced in accordance with the principles of the present invention.
Figure 1B:
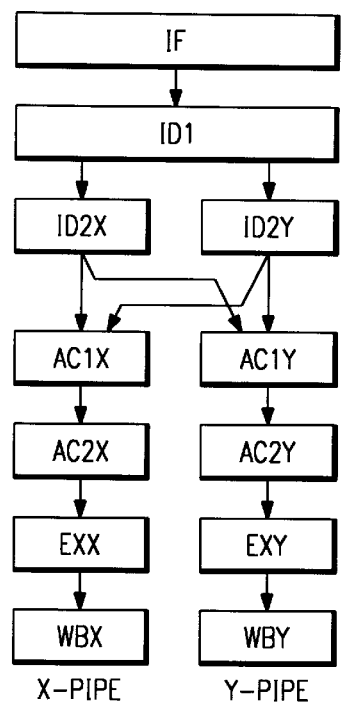

The exemplary processor system is shown in FIGS. 1a and 1b, and FIG. 2. FIGS. 1a and 1b respectively illustrate the basic functional blocks of the exemplary superscalar, superpipelined microprocessor along with the pipe stages of the two execution pipelines. FIG. 2 illustrates an exemplary processor system (motherboard) design using the microprocessor.

1.1. Microprocessor.

Referring to FIG. 1a, the major sub-blocks of a microprocessor 10 include: (a) CPU core 20, (b) prefetch buffer 30, (c) prefetcher 40, (d) branch processing unit (BPU) 50, (e) translation lookaside buffer (TLB) 60, and (f) unified 16 Kbyte code/data cache 70, including TAG RAM 72. A 256 byte instruction line cache 75 provides a primary instruction cache to reduce instruction fetches to the unified cache, which operates as a secondary instruction cache. An onboard floating point unit (FPU) 80 executes floating point instructions issued to it by the CPU core 20.

The microprocessor uses internal 32-bit address and 64-bit data buses ADS and DATA, respectively. A 256 bit (32 byte) prefetch bus (PFB), corresponding to the 32 byte line size of the unified cache 70 and the instruction line cache 75, allows a full line of 32 instruction bytes to be transferred to the instruction line cache in a single clock. Interface to external 32 bit address and 64 bit data buses is through a bus interface unit (BIU).

The unified cache 70 is 4-way set associative (with a 4k set size), using a pseudo-LRU replacement algorithm, with write-through and write-back modes. It is dual ported (through banking) to permit two memory accesses (data read, instruction fetch, or data write) per clock. The instruction line cache is a fully associative, lookaside implementation (relative to the unified cache), using an LRU replacement algorithm.

The FPU includes a load/store stage with 4-deep load and store queues, a conversion stage (32-bit to 80-bit extended format), and an execution stage. Loads are controlled by the CPU core 20, and cacheable stores are directed through the write buffers 27 (i.e., a write buffer is allocated for each floating point store operation).

The CPU core 20 is a superscalar design with two execution pipes X and Y. It includes an instruction decoder 21, address calculation units 22X and 22Y, execution units 23X and 23Y, and a register file 24 with 32 32-bit registers. An AC control unit 25 includes a register translation unit 25a with a register scoreboard and register renaming hardware. A microcontrol unit 26, including a microsequencer and microROM, provides execution control.

Writes from CPU core 20 are queued into twelve 32 bit write buffers 27 write buffer allocation is performed by the AC control unit 25. These write buffers provide an interface for writes to the unified cache 70 non-cacheable writes go directly from the write buffers to external memory. The write buffer logic supports optional read sourcing and write gathering.

A pipe control unit 28 controls instruction flow through the execution pipes, including: keeping the instructions in order until it is determined that an instruction will not cause an exception, squashing bubbles in the instruction stream, and flushing the execution pipes behind branches that are mispredicted and instructions that cause an exception. For each stage, the pipe control unit keeps track of which execution pipe contains the earliest instruction, provides a "stall" output, and receives a "delay" input.

Referring to FIG. 1b, the microprocessor has seven-stage X and Y execution pipelines: instruction fetch (IF), two instruction decode stages (ID1, ID2), two address calculation stages (AC1, AC2), execution (EX), and write-back (WB). Note that the complex instruction decode and address calculation pipe stages are superpipelined.

The IF stage provides a continuous code stream into the CPU core 20. The prefetcher 40 fetches 16 bytes of instruction data into the prefetch buffer 30 from either the (primary) instruction line cache 75 or the (secondary) unified cache 70. BPU 50 is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder 21 retrieves 16 bytes of instruction data from the prefetch buffer 30 each clock. In ID1, the length of two instructions is decoded (one each for the X and Y execution pipes) to obtain the X and Y instruction pointers a corresponding X and Y bytes-used signal is sent back to the prefetch buffer (which then increments for the next 16 byte transfer). Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, PUSHA/POPA, and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). During this pipe stage, data dependencies are also checked and resolved using the register translation unit 25a (register scoreboard and register renaming hardware) the 32 physical registers 24 are used to map the 8 general purpose programmer visible logical registers defined in the X86 architecture (EAX, EBX, ECX, EDX, EDI, ESI, EBP, ESP). During the AC2 stage, the register file 24 and the unified cache 70 are accessed with the physical address (for cache hits, cache access time for the dual ported unified cache is the same as that of a register, effectively extending the register set) the physical address is either the linear address, or if address translation is enabled, a translated address generated by the TLB 60.

Translated addresses are generated by the TLB from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the TLB (available early in AC2). Checks for any segmentation and/or address translation violations are also performed in AC2.

Instructions are kept in program order until it is determined that they will not cause an exception. For most instructions, this determination is made during or before AC2 floating point instructions and certain exclusive instructions may cause exceptions during execution. Instructions are passed in order from AC2 to EX (or in the case of floating point instructions, to the FPU) because integer instructions that may still cause an exception in EX are designated exclusive, and therefore are issued alone into both execution pipes, handling exceptions in order is ensured.

The execution stages EXX and EXY perform the operations defined by the instruction. Instructions spend a variable number of clocks in EX, i.e., they are allowed to execute out of order (out of order completion). Both EX stages include adder, logical, and shifter functional units, and in addition, the EXX stage contains multiply/divide hardware.

The WB stage updates the register file 24, condition codes, and other parts of the machine state with the results of the previously executed instruction.

The microprocessor 10 supports speculative execution in the case of both branch and floating point instructions. That is, instructions following either a floating point instruction, or a branch for which the BPU 50 has predicted the direction (taken or not taken), are speculatively allowed to proceed in the execution pipelines and complete execution. If a floating point instruction faults (which may be tens or even hundreds of clocks after being issued to the FPU) or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the machine state at each pipe stage as a floating point or predicted branch instruction enters that stage. For these checkpointed instructions, all resources (programmer visible registers, instruction pointer, condition code register) that can be modified by succeeding speculatively issued instructions are checkpointed. If a checkpointed floating point instruction faults or a checkpointed branch is mispredicted, the execution pipeline is flushed behind the checkpointed instruction for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or floating point instruction does not fault).

1.2. System.

Referring to FIG. 2, for the exemplary embodiment, microprocessor 10 is used in a processor system that includes a single chip memory and bus controller 82. The memory/bus controller 82 provides the interface between the microprocessor and the external memory subsystem level two cache 84 and main memory 86 controlling data movement over the 64 bit processor data bus PD (the data path is external to the controller which reduces its pin count and cost).

Controller 82 interfaces directly to the 32-bit address bus PADDR, and includes a one bit wide data port (not shown) for reading and writing registers within the controller. A bi-directional isolation buffer 88 provides an address interface between microprocessor 80 and VL and ISA buses.

Controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bi-directional 32/16 multiplexer 96 formed by dual high/low word [31:16]/[15:0] isolation buffers. The VL bus interfaces to standard VL slots 97, and through a bi-directional isolation buffer 98 to the low double word [31:0] of the 64 bit processor data bus.

2. Generalized Pipeline Architecture.

Figure 3:
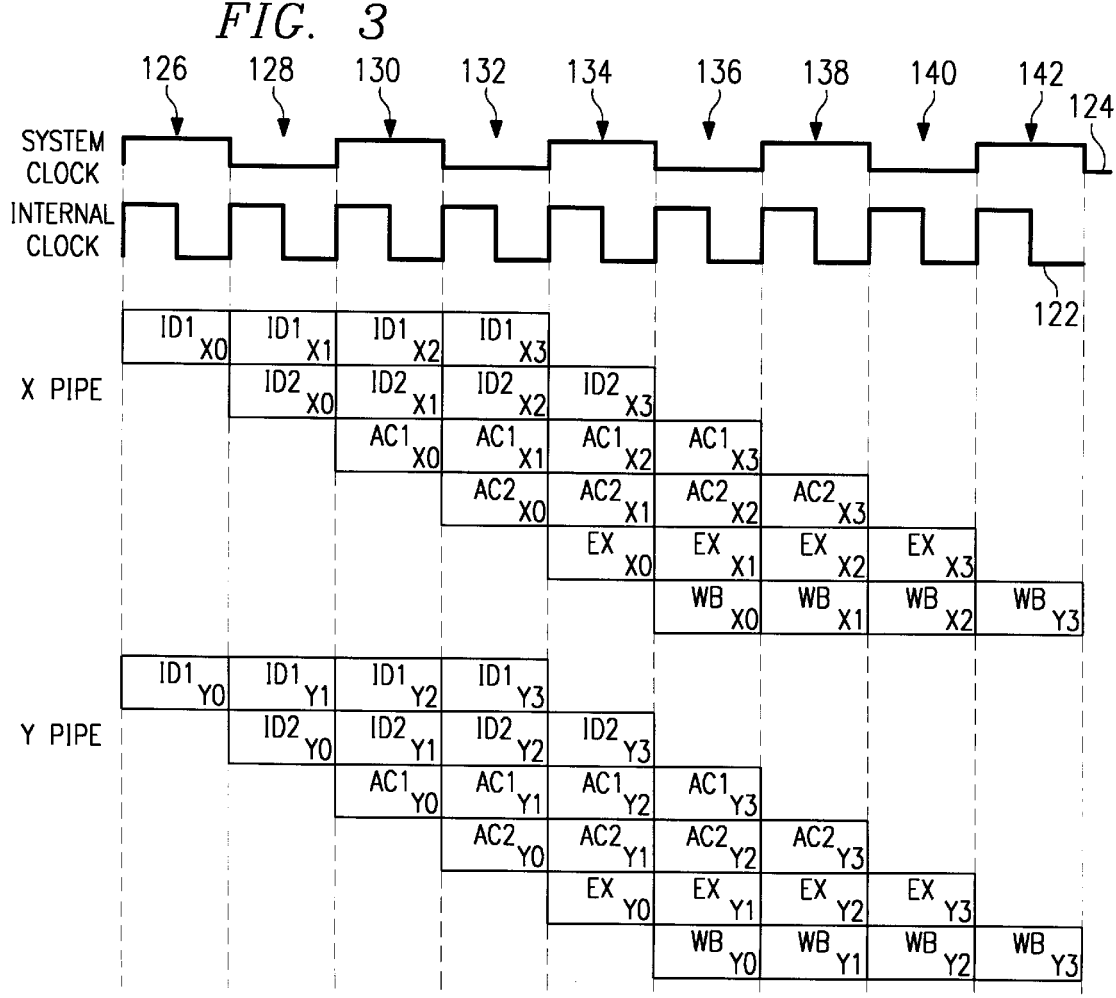
FIG. 3 illustrates a timing diagram showing the flow of instructions through the pipeline stages.

FIG. 3 illustrates the flow of four instructions through the pipeline, showing the overlapping execution of the instructions, for a two pipeline architecture. Additional pipelines and additional stages for each pipeline could also be provided. In the preferred embodiment, the microprocessor 10 uses an internal clock 122 which is a multiple of the system clock 124. In FIG. 3, the internal clock is shown as operating at two times the frequency of the system clock. During the first internal clock cycle 126, the ID1 stage operates on respective instructions X0 and Y0. During internal clock cycle 128, instructions X0 and Y0 are in the ID2 stage (X0 being in ID2x and Y0 being in ID2y) and instructions X1 and Y1 are in the ID1 stage. During internal clock cycle 130, instructions X2 and Y2 are in the ID1 stage, instructions X1 and Y1 are in the ID2 stage (X1 being in ID2x and Y1 being in ID2y) and instructions X0 and Y0 are in the AC1 stage (X0 being in AC1x and Y0 being in AC1y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage. The instructions continue to flow sequentially through the stages of the X and Y pipelines. As shown in clocks 134–140, the execution portion of each instruction is performed on sequential clock cycles. This is a major advantage of a pipelined architecture the number of instructions completed per clock is increased, without reducing the execution time of an individual instruction. Consequently a greater instruction throughput is achieved with greater demands on the speed of the hardware.

The instruction flow shown in FIG. 3 is the optimum case. As shown, each pipe stage completes on time and no stage requires more than one clock cycle. In an actual machine, however, one or more stages may require additional clock cycles to complete thereby changing the flow of instructions through the other pipe stages. Furthermore, the flow of instructions through one pipeline may be dependent upon the flow of instructions through the other pipeline.

A number of factors may cause delays in various stages of one or all of the pipelines. For example, an access to memory may miss in the memory cache, thereby preventing access of the data in the time required to process the instruction in one clock. This would require that either, or both, sides of the AC1 stage to delay until the data was retrieved from main memory. For a particular stage, other stages of the pipeline may be using a needed resource, such as a multiplier, which is only in one of the execution stages in the illustrated embodiment. In this case, the stage must delay until the resource is available. Data dependencies can also cause delays. If an instruction needs the result from a previous instruction, such as an ADD, it must wait until that instruction is processed by the execution unit.

Other delays are caused by "multi-box" instructions; i.e., instructions which are implemented using multiple microinstructions, and therefore require more than one clock cycle to complete. These instructions stop the flow of subsequent instructions through the pipeline at the output of the ID2 stage.

The flow of instructions through the pipeline is controlled by the pipe control unit 28. In the preferred embodiment, a single pipe control unit 28 is used to control the flow of instructions through both (or all) of the pipes. To control the flow of instructions through the pipes, the pipe control unit 28 receives "delay" signals from the various units comprising the pipelines 102 and 104, and issues "stall" signals to the various units.

Although a single pipe control unit 28 is used for both X and Y pipelines, the pipelines themselves are controlled independent of one another. In other words, a stall in the X pipeline does not necessarily cause a stall in the Y pipeline.

3. Single Clock Instruction Decode

FIG. 4a depicts a block diagram having certain components involved in the generation of microaddresses and the resulting microinstructions. While the blocks of FIG. 4a derive from those in FIG. 1, it should be understood that the method of the present invention is not necessarily limited by the particular locations of specific components, and one skilled in the art may relocate various functionality without departing from the inventive scope. With reference to FIG. 4a, instructions for both the x- and y-pipelines are coupled to an instruction decoder 21. Decoder 21 receives the x- and y-instructions and provides both microaddresses and control to microcontrol unit 26. More particularly, the microaddresses and control are coupled to a microsequencer circuit 146 within microcontrol unit 26. In the preferred embodiment, microsequencer circuit 146 includes independent microsequencers 146x and 146y for performing like functions with respect to the x- and y-pipelines. Microsequencer circuit 146 also receives both control and microaddresses from other sources (not shown) throughout the microprocessor. Microsequencer circuit 146 is coupled to provide addresses, hereinafter referred to as microaddresses, to address the memory (shown and described later) in a microROM 148.

FIG. 4b illustrates the timing of microaddress generation, microinstruction generation, and microinstruction execution by the blocks of FIG. 4a. Note that the timing of FIG. 4b derives from FIG. 3, but with greater emphasis on the stages corresponding to the operations of the blocks of FIG. 4a. Note also that the stages of FIG. 4b illustrate the sequence of an x-and y-instruction through four internal clock cycles evenly numbered 150 through 156. Clock cycles 150 through 156 include the ID2, AC1, AC2 and EX stages. Note also that each clock cycle includes two phases, denoted $\phi1$ and $\phi2$.

The general operation of the blocks of FIG. 4a and the timing of FIG. 4b, both in connection with a single clock instruction, are as follows. As mentioned in connection with FIG. 3, during stage ID1, instruction decoder 21 determines the number of bytes in the single clock instruction and the types of fields included in the instruction. As detailed in section 6, below, decoder 21 also provides entry point microaddresses derived from the instructions for addressing microROM 148. During stage ID2, microsequencer circuit 146 outputs the next microaddress for microROM 148 for both the x- and y-instruction. For purposes of explanation, the next microaddresses are labeled as $\mu sx_1$ and $\mu sy_1$, respectively, with $\mu s$ indicating output from the microsequencer. Note that $\mu x_1$ is output by microsequencer circuit 146 during the first phase, $\phi1$, of stage ID2. Similarly, $\mu sy_1$, is output by microsequencer circuit 146 during the second phase, $\phi2$, of stage ID2.

Microsequencer circuit 146 operates as a sophisticated multiplexer; thus, in response to its control signals, microsequencer circuit 146 chooses from its microaddress inputs to output the next microaddress. In the preferred embodiment, the next microaddress selected and output by microsequencer circuit 146 may be one of eight different microaddresses. The provision of some of the microaddresses is specifically described throughout this document, with it understood that the remainder fall within the general indication in FIG. 4a of an input providing microaddresses to multiplexer circuit 146. Briefly, the seven different microaddresses are:

(1) instruction entry point this microaddress is provided by decoder 21 and is selected when a new instruction is to enter the EX stage. The preferred method of generating this microaddress is discussed in detail in section 6.2, below;

(2) exception PLA this microaddress is selected to service an interrupt or an exception;

(3) NOP this microaddress is selected when there are no instructions in the corresponding pipeline to be executed;

(4) micro return this microaddress is selected from the top of the return stack;

(5) microROM next microaddress this microaddress is selected from the current output by microROM 148 and may be used to select the next sequential pair of microinstructions, or the target microaddress of certain calls or conditional microbranches;

(6) ntaken: this address is selected when certain conditional microbranches are not taken; and (7) change of flow microaddress this microaddress is a concatenated address formed in part from the microROM next microaddress and in part from an instruction decode circuit. The preferred method of generating this microaddress is discussed in detail in section 5, below.

The microaddresses are applied by microsequencer circuit 146 to microROM 148, which outputs a microinstruction to carry out whatever functionality is called for by the corresponding microaddress. Thus, returning to FIG. 4b, immediately following the output of microaddress $\mu sx_1$, that is, following $\phi1$ of stage ID2, $\mu sx_1$, is applied to microROM 148. As described in greater detail in section 4, below, between $\phi2$ of stage ID2 and by the end of $\phi1$ of stage AC1, an array within microROM 148 generates and outputs the corresponding microinstruction, labeled $\mu rx_1$. Note, for clarity, $\mu r$ suggests output from microROM 148. Moreover, immediately following the output of microaddress $\mu sy_1$ (following $\phi2$ of stage ID2), $\mu sy_1$, is applied to microROM 148. Also as detailed in section 4, below, between $\phi1$ and by the end of $\phi2$ of stage AC1, the array of microROM 148 generates and outputs the corresponding microinstruction, labeled $\mu ry_1$. Stage AC2 occurs in clock cycle 154 and the microinstructions corresponding to instructions X1 and Y1, $\mu rx_1$, and $\mu ry_1$, are presented to the applicable components of the microprocessor. Note in the preferred embodiment that each pipeline has its own respective address calculation stage and, thus, the x- and y-microinstructions are presented accordingly. Thus, clock cycle 154 is illustrated as applying to both "$x_1$ & $y_1$" during the entire duration of the AC2 stage. Moreover, in the AC2 stage, each respective microinstruction is decoded in preparation for execution. Finally, stage EX occurs in clock cycle 156, where the decoded instructions are applied to respective x- and y-pipelind ALUs, thereby executing the functions specified by the presented microinstructions. Like the AC2 stage, the x- and y-operations occur independently of one another and, hence, are illustrated as applying to both "$x_1$ & $y_1$" during the entire duration of the EX stage. Note that because FIG. 4b corresponds to the flow of a single clock instruction, only a single clock cycle 156 is necessary for the execution stage of the instruction. Multiple clock instructions require additional execution stages.

Having explained the general flow of FIG. 4b, note that one aspect of the present invention pertains to enhancing the timing of output by microROM 148 immediately following a single clock instruction. Particularly, the present invention recognizes that once a given instruction is determined to be a single clock instruction, it is desirable to advance the next successive instruction through the pipeline as soon as possible. More specifically, when the instruction presently passing through a pipeline is a single clock instruction and, thus, requires only a single clock cycle for its EX stage, it is preferable to immediately advance the next successive instruction so that it follows only one stage behind the present single clock instruction. FIG. 4c illustrates this preferred scenario.

Particularly, FIG. 4c illustrates a timing diagram including the instruction flow for two successive instructions through the x- and y-pipelines over the same clock cycles 150 through 156 shown in FIG. 4b. Subscripts in FIG. 4c illustrate the succession of the two instructions. The first x- and y-instructions, denoted with a subscript one, are single clock instructions and flow in the same manner as the instruction shown in FIG. 4b. The second x- and y-instructions, denoted with a subscript two, are additional instructions which follow one stage immediately behind the first x- and y-instructions. Given the immediate succession of instruction flow, no stage is wasted, that is, no clock cycle occurs during the illustrated instruction flow where the instruction is not processed by either the ID1, ID2, AC1, AC2, or EX stage.

The prior art is unable to achieve the preferred flow of FIG. 4c for a single clock instruction. FIG. 4d illustrates a timing diagram of the flow in the prior art for the two paired instructions of FIG. 4c. Note that the microsequencer outputs for the second instruction, $\mu sx_2$ and $\mu sy_2$, are output during clock cycle 154, rather than clock cycle 152 as shown in the inventive preferred flow of FIG. 4c. Thus, clock cycle 152 is wasted in the prior art. Such a result occurs because of the prior art methodology in controlling the microsequencer circuit's output. Specifically, in the prior art, the microinstruction output by the microROM for a single clock instruction, $\mu r$, includes a control signal which subsequently (after a wasted clock cycle) causes the microsequencer circuit to output the next microROM microaddress, $\mu s$. More particularly, for each different microinstruction, a given bit or bits in $\mu r$ indicate that an instruction is a single clock instruction. Only after this indication is the microsequencer caused to output the next microaddress, $\mu s$. This indication and delay is shown by an arrow in FIG. 4d. As shown, at the end of $\phi 1$ of clock cycle 152, the microinstruction, $\mu rx1$, indicates that its corresponding instruction is a single clock instruction. As described above, the next microaddress, $\mu sx2$, is output only after this indication and, thus, cannot occur until the beginning of clock cycle 154. Thus, in effect, the microsequencer must "wait on" the microROM output and, hence, at least one clock cycle is wasted during this waiting period. Note that the same delay occurs for the y-pipeline as shown by the delay arrow in FIG. 4d between the microROM output $\mu ry1$, and the responsive next output by the microsequencer, $\mu sy2$. In contrast to FIG. 4d, however, the present invention includes a novel apparatus and methodology for achieving the preferred and improved flow of FIG. 4c, and is described below.

Figure 5:
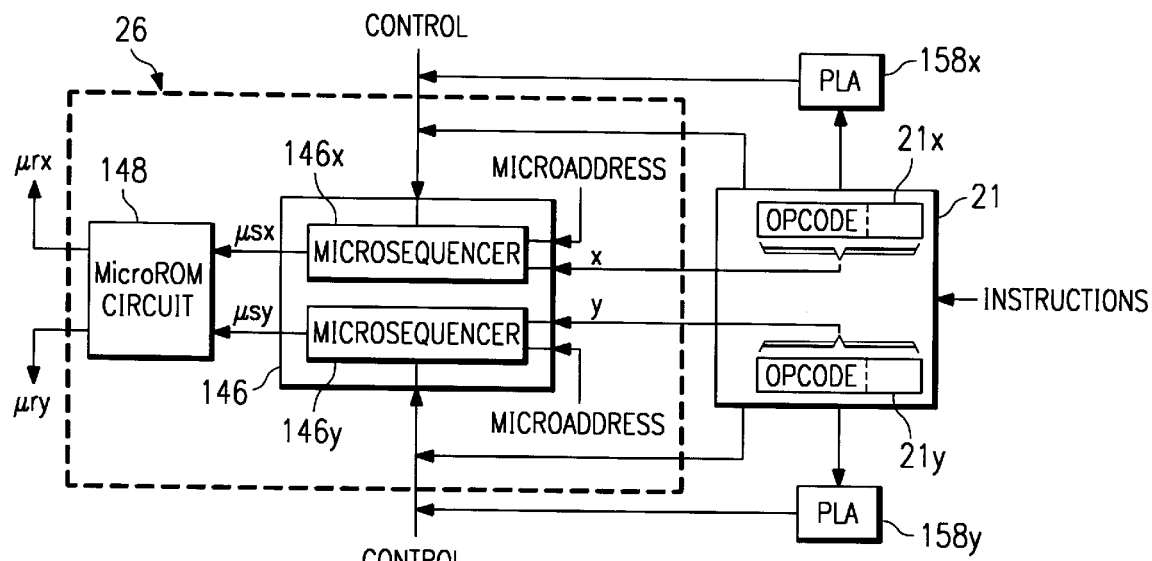

FIG. 5 illustrates the block diagram of FIG. 4a, but with additional details used to achieve the preferred timing of FIG. 4c. Specifically, instruction decoder 21 includes separate registers 21x and 21y for the x- and y-instructions, respectively. Moreover, each separate register 21x and 21y is coupled to a respective programmable logic array ("PLA"). More particularly, PLAs 158x and 158y are coupled to the portions of registers 21x and 21y storing the opcode of each instruction. Note that while the opcode is illustrated as left-justified within each respective register 143x and 143y, such an illustration is arbitrary in that the opcode may be stored anywhere within the buffer and is not necessarily represented by contiguous bits therein. Each PLA 158x and 158y is further coupled to the control input of a respective microsequencer 146x and 146y. Lastly, while not illustrated, note that each PLA 158x and 158y may be further coupled to additional inputs to perform the functionality described below.

The operation of the components of FIG. 5 are best explained in the context of the timing diagram of FIG. 4c. Assume first that each instruction register 21x and 21y stores two sequentially pipelined instructions, $x_1$ and $x_2$, and $y_1$ and $y_2$, respectively. Thus, as shown in FIG. 4c, during $\phi 1$ of the ID2 stage of clock cycle 150, microsequencer 146x receives control signals and outputs the next microaddress, $\mu sx_1$. Moreover, during $\phi 2$ of the ID2 stage of clock cycle 150, microsequencer 146y receives control signals and outputs the next microaddress, $\mu sy_1$. Once $\mu sx_1$ and $\mu sy_1$ are output, they are applied to microROM 148 to generate $\mu rx_1$ and $\mu ry_1$ as described above.

Returning to the ID2 stage occurring in clock cycle 150, however, note that each PLA 158x and 158y decodes the opcode of the respective instruction to determine whether the current instruction is a single clock instruction. In the preferred embodiment, the PLA is programmed to detect any possible pattern of opcode bits which comprise a single clock instruction. This detection may be based on a portion or all of the opcode bits. If the PLA detects a single clock instruction, the PLA controls its respective microsequencer to output the next microaddress, $\mu s$, during the immediately following clock cycle. For example, if PLA 158x determines that instruction $x_1$ is a single clock instruction, PLA 158x controls microsequencer 146x to output the next microaddress, $\mu sx_2$, during the next clock cycle 152 as shown in FIG. 4c. As another example, if PLA 158y determines that instruction $y_1$ is a single clock instruction, PLA 158y controls microsequencer 146y to output the next microaddress, $\mu sy_2$, during the next clock cycle 152 as shown in FIG. 4c.

Note that each PLA 158x and 158y may analyze information in addition to selected opcode bits determine whether an instruction is a single clock instruction. For example, in an X86 architecture, other bits within the instruction may be analyzed, such as selected bits of the mod r/m byte. Moreover, in addition to opcode bits, bits outside the instruction may also be analyzed. For example, a bit indicating whether or not the protected mode is set also may be analyzed in determining whether an instruction is a single clock instructions. Other examples may become known to a person skilled in the art, and are intended as within the scope of the present invention.

From the above, it should be appreciated that the configuration of FIG. 5 eliminates the wasted clock cycle between successive microinstructions as possible in the prior art. Such an advance is extremely beneficial for a microprocessor using numerous single clock instructions because delay is reduced with respect to each of those instructions. As stated at the outset, instruction throughput is of primary importance and, as now shown, the present invention enhances such throughput. Note that it should be understood that a person skilled in the art may choose alternatives without necessarily departing from the inventive scope. For example, while the example discussed in connection with FIG. 4c illustrates single clock instructions in both the x- and y-pipelines, the present invention also applies to a dual pipeline architecture when only one of the two pipelines is executing a single clock instruction (i.e., irrespective of the number of execution stages required by the instruction in the other pipeline). Thus, the invention also applies to other single or multiple pipeline architectures. As yet another example, while a PLA is shown monitoring opcode bits, structure other than a PLA may be used to detect the presence of a single clock instruction. As still another example, bits other than opcode bits may, given a particular architecture, be analyzed if representative of a single clock instruction.

4. Single MicroROM Operation For Supporting Dual Pipeline Architecture.

As mentioned in connection with FIGS. 4a–d, the processor architecture of the present invention includes a microROM 148 which receives microaddresses, and produces microinstructions, in accordance with the timing diagram of FIG. 4c. The present invention uses additional novel apparatus and methodology to achieve such timing while using a single microROM array. Particularly, FIG. 6 illustrates such apparatus, and FIG. 7 illustrates the detailed timing for the apparatus of FIG. 6.

Figure 6:
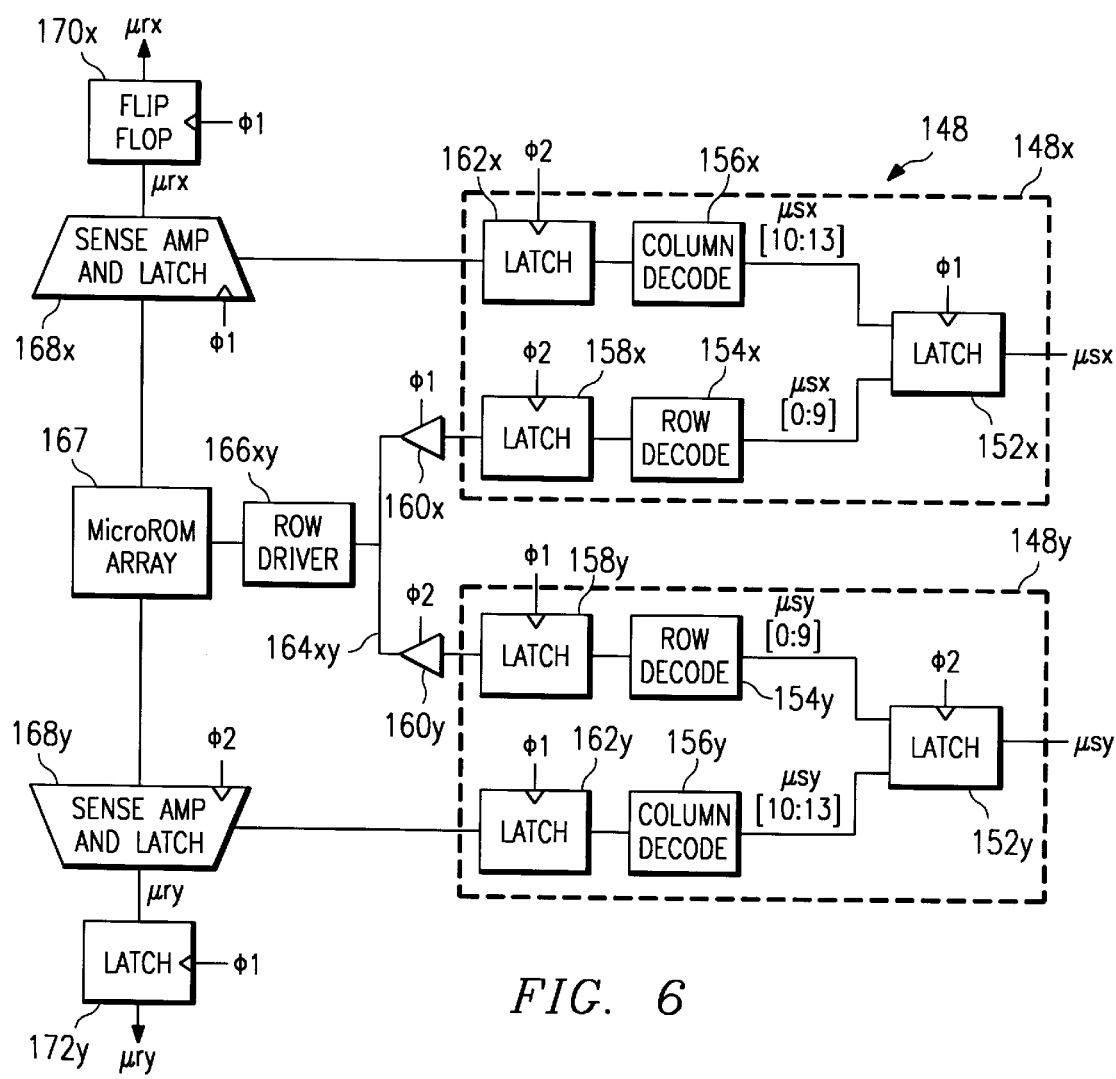
FIG. 6 illustrates a more detailed block diagram of the microROM depicted in FIG. 5.
Figure 7:
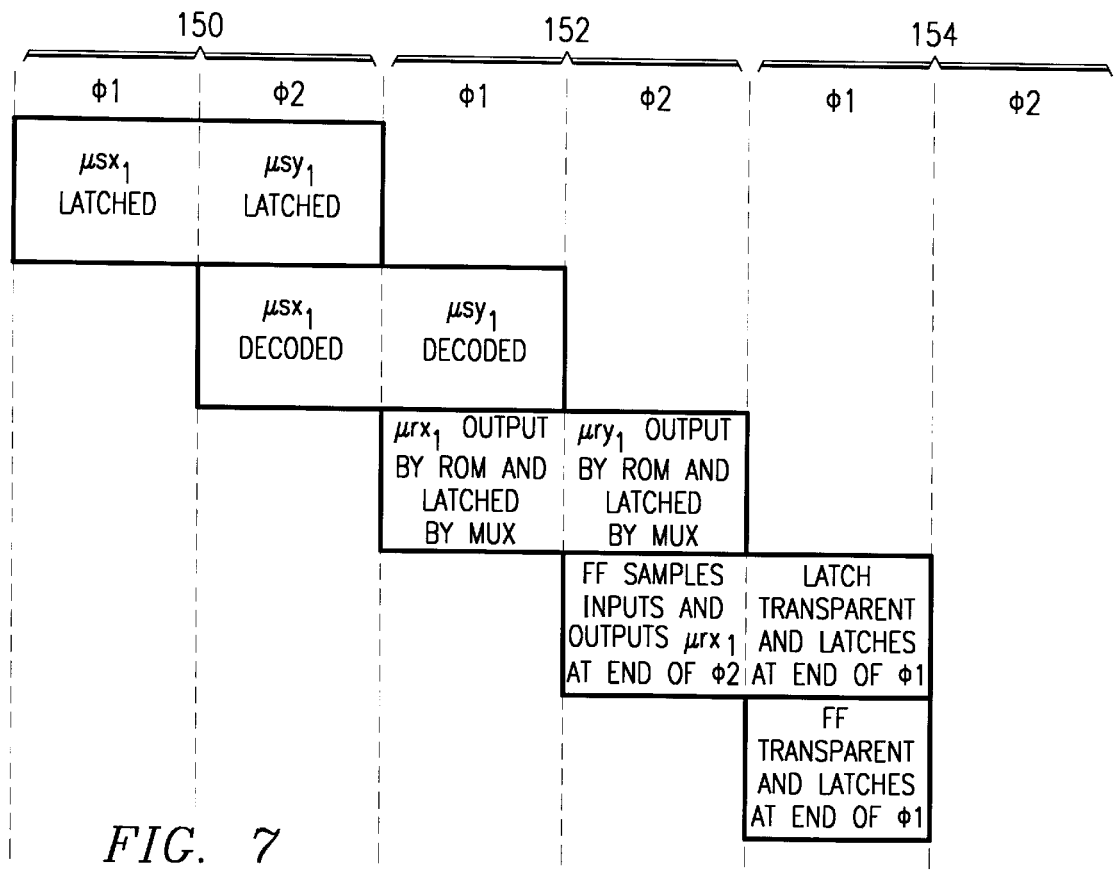
FIG. 7 illustrates a timing diagram for both the x- and y-accessing of the microROM array of the microROM depicted in FIG. 6.

With reference to FIG. 6, microROM 148 is shown in greater detail using blocks to represent various functionality. The blocks include a single microROM array 167 which services both the x- and y-pipelines. MicroROM array 167 includes a plurality of rows and columns for storing microinstructions which are addressed and output by the various blocks of FIG. 6. With the exception of two components described below, the remainder are generally symmetric about the microROM array 167; accordingly, the following description focuses on the x-related blocks, with corresponding reference numerals using the "x" designation. Components pertaining to the y-related blocks are likewise labeled, but use the "y" designation.

The microaddress, $\mu$sx, is coupled to the input of a latch 152x which is clocked by $\phi1$. In the preferred embodiment, $\mu$sx is a fourteen bit address which is broken into separate components for addressing a row and column of microROM array 167, respectively. Specifically, microinstructions are stored in array 167 such that sixteen instructions are stored along a row. Thus, once a row is selected, one of sixteen columns from that row is further selected to choose the particular microinstruction from the many stored along the row. In particular, ten bits of $\mu$sx are coupled from latch 152 to the input of a row decode block 154x. Similarly, four bits of $\mu$sx are coupled from latch 152 to the input of a column decode block 156x. While the groups of ten bits are shown as the first ten bits of $\mu$sx (i.e., [0:9]) and the last four bits of $\mu$sx (i.e., [10:13]), it should be understood that non-contiguous bits of $\mu$sx may be selected for either row or column decoding. It also should be understood that the microaddresses, $\mu$sx and $\mu$sy, may consist of more or less than fourteen bits.

The output of row decode block 154x is coupled to the input of a latch 158x clocked by $\phi2$. Further, the output of latch 158x is coupled to the input of a tristate driver 160x clocked by $\phi1$. Similarly, the output of column decode block 15x is coupled to the input of a latch 162x, which is clocked by $\phi2$.

The output of tristate driver 160x is coupled to an address bus denoted 164xy suggesting, as discussed below, that either x- or y-addresses may be communicated on the bus. Indeed, note that the output of tristate driver 160y is also coupled to address bus 164xy. Address bus 164xy is coupled to the input of row driver 166xy, which is further coupled to microROM array 167. The circuitry symmetry in FIG. 6 creates componentry for the y-row related circuitry similar to that just described in connection with x-row related circuitry. Thus, bits [0:9] of $\mu$sy are coupled to a row decode block 154y which has an output coupled to the input of a latch 158y. The output of latch 158y is coupled to the input of a tristate driver 160y, which has an output coupled to address bus 164xy. Note, however, that although the data path for the y-row circuitry is similar to the x-row circuitry, the clock signals for latch 158y and driver 160y are switched to achieve the timing function described below.

Returning to the x-column related circuitry, the output of latch 162x is coupled to the control inputs of a sense amplifier, latch and multiplexer block 168x. Note that block 168x is capable of performing each of the functions of its name. Particularly, the data input of block 168x is coupled to an output of microROM array 167. Moreover, block 168x is clocked by $\phi1$ to performing a latching function. Lastly, because the output of latch 162x is coupled to the control input of block 168x, block 168x latches only selective portions (i.e., a particular column) of a row of data output by microROM array 167 as discussed in greater detail below. The output of block 168x is coupled to the input of a flip flop 170x which is clocked by $\phi1$. The output of flip flop 170x is coupled to any line, bus, or architecture which requires access to the x-microinstruction produced by microROM array 167.

The circuitry symmetry in FIG. 6 creates similar componentry for the y-column related circuitry. Thus, bits [10:13] of $\mu$sy are coupled to a column decode block 156y which is further coupled to the input of a latch 162y. The output of latch 162y is coupled to the control input of a sense amp, latch and multiplexer block 168y. Again, the y-column data path is therefore generally the same as they x-row data path, but the clocking signals are reversed to achieve the timing described below. Note also, however, that the y-row data path differs slightly in one regard, namely, the output of multiplexer block 168y is coupled to the input of a latch 172y. This is in contrast to the output of multiplexer block 168x which is coupled to a flip flop rather than a latch. This difference also accommodates the timing functionality described below. Moreover, the output of latch 172y is coupled to any line, bus, or architecture which requires access to the y-microinstruction produced by microROM array 167.

As shown in FIG. 4c, one invention of the preferred architecture involves two accesses of microROM 148 in the same clock cycle 150, but in separate phases, $\phi1$ and $\phi2$. Further, by applying $\mu$rx and $\mu$ry to microROM 148 in a single clock cycle, $\mu$rx is fully available by the end of one clock cycle after $\mu$sx and, similarly, $\mu$ry is fully available by the end of one clock cycle after $\mu$sy. The blocks of FIG. 6 permit such operation, and are best understood by the more detailed timing diagram of FIG. 7.

FIG. 7 illustrates a detailed timing diagram for both the x- and y-accessing of microROM array 167 during the clock cycles 150 through 154, similar to those cycles represented in FIG. 4b. For purposes of clarity, the operation in connection with the x-pipeline (i.e., x-microaddress and x-microinstruction) is described first and illustrated along the leftmost portion of the diagonal flow of the figure. Similarly, the operation in connection with the y-pipeline (i.e., y-microaddress and y-microinstruction) is described second and illustrated along the rightmost portion of the figure.

With reference to the leftmost portion of FIG. 7, $\mu$sx$_1$, is latched by latch 152x by the close of $\phi1$ of clock cycle 150.

Accordingly, the appropriate bits of $\mu sx_1$ are provided to row and column decode blocks 154x and 156x, respectively. Each of these decode blocks decodes the bits according to principles known in the art to identify the corresponding row and column within microROM array 167 which are addressed by $\mu sx_1$. Thus, the microaddress decode occurs during φ2 of clock cycle 150, and resulting row and column decoded signals are latched at the close of φ2 of clock cycle 150 by latches 158x and 162x, respectively. Note the decoded column signal output by latch 162x is immediately coupled to the control input of multiplexer block 168x.

Next, with the immediately following rising transition of φ1 during clock cycle 152, tristate driver 160x drives address bus 164xy with the decoded row value latched in latch 158x. This value is received by driver 166xy which, in accordance with principles known in the art, provides a sufficient driving signal(s) to the selected row of microROM array 167. Thus, during φ1 of clock cycle 152, the driving operation and response by the microROM array 167 generates and outputs the appropriate signals of the addressed row. At the falling edge of φ1 of clock cycle 152, the multiplexer 168x latches selected bits of the row of signals output by the microROM array 167. Particularly, certain bits (i.e., a column which stores the desired microinstruction,) are selected in response to the decoded column address received from latch 162x and latched to the output of multiplexer 168x. Note that this event also corresponds to the end of φ1 during clock cycle 152 shown in FIG. 4b, above.

During φ2 of clock cycle 152, flip flop 170x samples its input and, upon the falling edge of φ2, flip flop 170x outputs the sampled input. Accordingly, at the end of φ2 of cycle 152, the x-pipeline microinstruction, $\mu rx$, is available to the remainder of the processor for operation of the AC2 stage described above. Note also that flip flop 170x is included to isolate the current microinstruction from any potential changes occurring in the output of microROM array 167 or multiplexer 168x. In other words, after the falling edge of φ2 of clock cycle 152, any change in the output of either microROM array 167 or multiplexer 168x does not affect the output of flip flop 170x during the next phase, φ1 of cycle 154. Thus, any such change will not affect the components of the processor examining the current $\mu rx$ microinstruction.

Having described the operation of the x-microaddressing and x-microinstruction issuing methodologies, reference is now made to the rightmost portion of FIG. 7 to illustrate the contemporaneous operations with respect to the operations of issuing the y-microaddressing and y-microinstruction. First, $\mu sy_1$, is latched by latch 152y by the close of φ2 of clock cycle 150. Accordingly, the appropriate bits of $\mu sy_1$, are provided to row and column decode blocks 154y and 156y, respectively. Like the x-bits, but one phase later, the y-bits are decoded during φ2 of clock cycle 150 to identify the corresponding row and columns within microROM array 167 which are addressed by $\mu sy_1$. Moreover, the resulting row and column decoded signals are latched at the close of φ1 of clock cycle 152 by latches 158y and 162y, respectively.

Next, with the immediately following rising transition of φ2 during clock cycle 152, tristate driver 160y drives address bus 164xy with the decoded row value latched in latch 158y. Note that tristate driver 160x is in a high impedance mode during this time so that only the y-address is communicated to the address bus 164xy. Again, this value is received by driver 166xy which drives the selected row of microROM array 167. Thus, during φ2 of clock cycle 152, the driving operation and response by the microROM array 167 generates and outputs the appropriate signals of the addressed row. At the falling edge of φ2 of clock cycle 152, multiplexer 168y latches selected bits (i.e., a column) of the row of signals output by microROM array 167. In this instance, these bits, which represent the desired microinstruction, are selected in response to the decoded column address received from latch 162y and latched to the output of multiplexer 168y. Note that this event also corresponds to the end of φ2 during clock cycle 152 shown in FIG. 4b, above.

During φ1 of clock cycle 154, latch 172y becomes transparent so that the signals at its inputs become available at its outputs. Thus, at the rising edge of φ1 of clock cycle 154, the remainder of the processor has access to the y-pipeline microinstruction, $\mu ry$. Note that latch 172y, like that flip flop 170x, is included to isolate the current microinstruction from any potential changes occurring in the output of microROM array 167 or multiplexer 168y. Thus, at the end of φ1 of cycle 154, any change in the output of either microROM array 167 or multiplexer 168y does not affect the output of latch 172y during the next phase, φ2 of cycle 154. Thus, any such change will not affect the components of the processor examining the current $\mu ry$ microinstruction.

From the above, it should be appreciated that the functional blocks set forth in FIG. 6 permit the preferred timing shown in FIG. 7. Thus, using separate phases, a single microROM array 167 may be accessed twice in a single clock cycle, while still providing microinstructions corresponding to each access within one full clock cycle of the access. Thus, independent x- and y-pipelines may share the same single array without sacrificing throughput. Note that it should be understood that a person skilled in the art may choose alternatives without necessarily departing from the inventive functionality and structure described. For example, clock widths may be adjusted so that more than two phases occur in what is deemed a "clock cycle," while still maintaining the ability for multiple pipelines to share the same micoROM array. This example, as well as others apparent to one skilled in the art, should not depart from the invention as defined by its claims.

5. Expediting Execution of Condition Dependent Instructions.

As discussed in connection with FIG. 4a, the preferred embodiment includes a microsequencer circuit 146 which operates as a sophisticated multiplexer to choose between various microaddresses at its inputs and output the selected microaddress for addressing microROM 148. In connection with microsequencer circuit 146, the present invention further includes apparatus and methodology for expediting the execution of condition dependent instructions. In the preferred embodiment, one example of such a condition dependent instruction is a change of flow ("COF") instructions. Such COF instructions are known in the art and, include, by way of example in the X86 architecture, instructions such as FAR JUMP, FAR CALL, and IRET. The preferred apparatus and methodology for expediting such COF instructions, as well as other condition dependent instructions, are described in connection with FIG. 8, immediately below.

Figure 8:
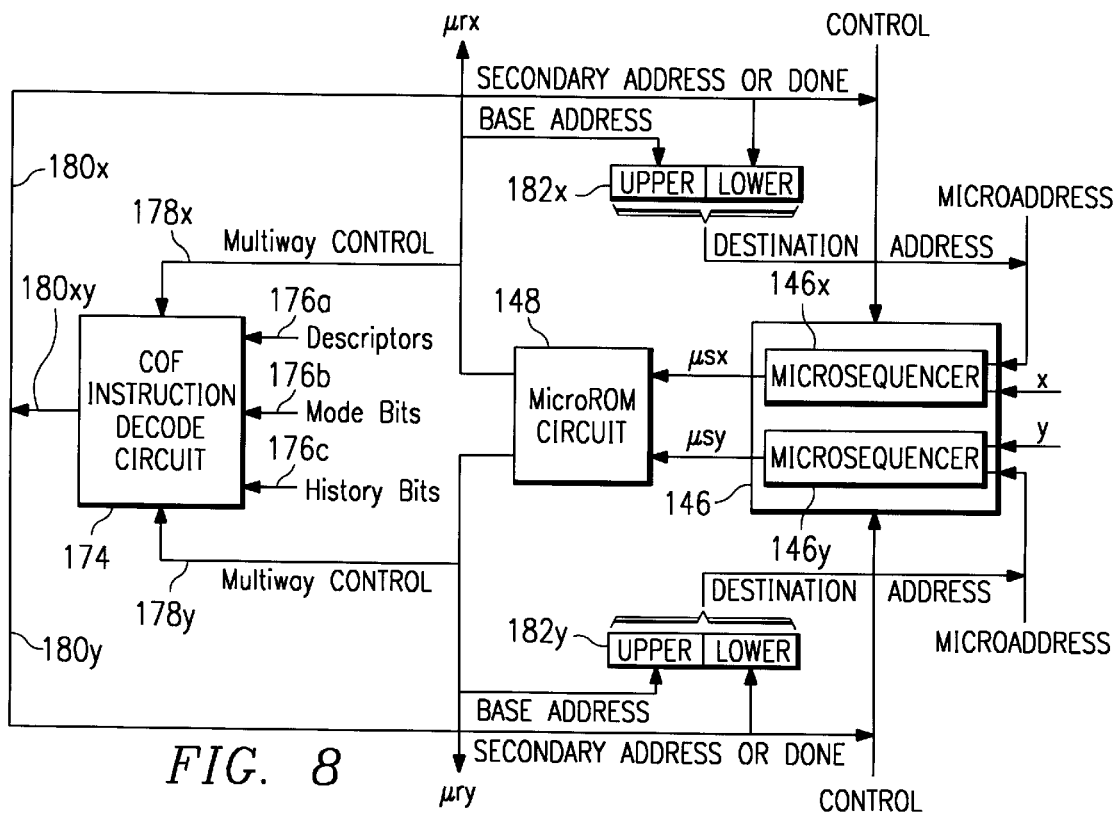
FIG. 8 illustrates a portion of the components of FIG. 4a, with additional aspects for expediting change of flow ("COF") or other condition dependent instructions.

FIG. 8 illustrates a portion of the components of FIG. 4a, with additional apparatus for expediting condition dependent instructions. For the remainder of this discussion, the preferred embodiment is discussed, by way of example, as applying to COF instructions. It should be understood, however, that the COF instruction is by way of example, and is not intended to limit the scope of the invention as defined by its claims. Therefore, continuing with FIG. 8, it again illustrates microsequencer circuit 146 receiving microaddresses and, via various control signals, providing microaddresses $\mu sx$ and $\mu sy$ to microROM 148. Particularly, however, apparatus in addition to FIG. 4a is shown for providing microaddresses and control in connection with COF instructions. Specifically, FIG. 8 further illustrates a COF instruction decode circuit 174. COF instruction decode circuit 174 includes various data inputs, preferably including an input 176a for receiving descriptors, an input 176b for receiving mode bits, and an input 176c for receiving "history bits." History bits include selected bits stored from previously issued instructions and/or bits from previously executed microinstructions corresponding to the present instruction being executed. COF instruction decode circuit further includes control inputs 178x and 178y for receiving control signals corresponding to the respective x-and y-instructions. For purposes more readily apparent below, these control signals are referred to herein as the x-Multiway and y-Multiway control signals, respectively.

COF instruction decode circuit further includes an output 180xy, which is illustrated as splitting into respective x- and y-outputs 180x and 180y. Output 180x is coupled to provide a SECONDARY ADDRESS to the lower portion of an address register 182x, or a DONE signal to control microsequencer 146x. Similarly, output 180y is coupled to provide the SECONDARY ADDRESS to the lower portion of an address register 182y, or the DONE signal to control microsequencer 146y. The upper portion of address register 182x is coupled to the x-output of microROM 148 and, thus, is capable of receiving a portion of the x-microinstruction, μrx. As described in greater detail below, this connection permits μrx to provide a BASE ADDRESS to the upper portion of address register 182x, Similarly, the upper portion of address register 182y is coupled to the y-output of microROM 148 and, thus, is capable of receiving a portion of the y-microinstruction, μry. Thus, also as described in greater detail below, this connection permits pry to provide a BASE ADDRESS to the upper portion of address register 182y.

Before proceeding with the operation of the apparatus of FIG. 8, a discussion of at least one known prior art technique for handling COF instructions, or other types of conditional dependent instructions, is instructive. This discussion is further described using the microinstructions of Table 1, with it understood that such microinstructions are provided solely by way of example to facilitate an understanding of the known prior art. In the known prior art, a COF instruction would commence its execution stage by addressing a first microinstruction within the microROM. For the COF instruction, after its first, or subsequent microinstructions, a series of sequential conditional microinstruction JUMPs ("CJUMP") are typically encountered, wherein each of those CJUMPs tested various conditions. Thus, referring to Table 1, consider the instance where a COF instruction commenced by addressing the first of the four successive microinstructions located at address 1 of the microROM:

TABLE 1

| Microinstruction Address | Microinstruction | Destination if condition met |
| --- | --- | --- |
| 1 | CJUMP condition #1 | 10 |
| 2 | CJUMP condition #2 | 10 |
| 3 | CJUMP condition #3 | 12 |
| 4 | CJUMP condition #4 | 13 |
| 5 | Done | |

In the prior art, if condition #1 were met, the microROM would output address 10, which is the next (or "destination") microinstruction address within itself for continuing the execution of the COF instruction. The process flow would then sequence by jumping to the microinstruction at location 10, and continue until the functionality for the COF instruction was completed. If condition #1 were not met, however, then a counter was used to increment a portion of the microaddress which identified the then-executing microinstruction. Thus, the incremented value would identify address 2 and so the sequence would address the microinstruction at that address. Again, the successive microinstruction would test another condition, namely, condition #2. The process would repeat until a condition was met, or all conditions in the succession were tested with no satisfaction. If no conditions were met, the microROM would issue a DONE signal, thereby indicating that the COF instruction had completed its execution cycle, and the instruction entry point into the microROM for the next instruction could be accessed. Note that the above example uses sequential numbers only to facilitate an understanding of the concept, but is not intended to indicate that the conditional microinstructions are necessarily addressed in an integer incremental fashion.

From Table 1 and its corresponding description, one skilled in the art may readily appreciate that numerous CJUMPs may be necessary before a condition corresponding to the COF instruction (or other conditional dependent instruction) being executed is satisfied. Typically, each testing of a condition and issuance of the next condition to be tested expends at least one clock cycle. Thus, if numerous conditions are unsatisfied for a given COF instruction, numerous clock cycles are expended in executing that COF instruction. In the preferred embodiment of the present invention, however, and as described immediately below, such conditional testing is reduced to a single clock cycle, with the clear benefit of reducing the number of potential clock cycles and, thus, enhancing overall processing speed.

Having described the prior art example above, reference is made to the operation of the apparatus of FIG. 8. When the COF (or other condition dependent) instruction is received by the instruction decoder (see, e.g., FIG. 4a), its execution stage commences by issuing a control signal from microROM 148. For purposes of explanation, this signal is identified herein as "Multiway," indicating that flow can result in multiple destinations (i.e., ways) in the next successive clock cycle. Thus, if the COF instruction is executing in the x-pipeline, an x-Multiway control signal is output by the microROM 148 as part of the x-microinstruction. The x-Multiway control signal controls COF instruction decode circuit 174 as described below. The x-microinstruction also simultaneously includes a BASE ADDRESS which loads into the upper portion of address register 182x.

COF instruction decode circuit 174 preferably includes combinatorial logic which analyzes the preferred information at its inputs 176a, 176b, and 176c, and determines a SECONDARY ADDRESS in response to those inputs. In the preferred embodiment, the SECONDARY ADDRESS is a four bit signal and, thus, is capable of identifying up to sixteen (i.e., $2^4$=16) specific addresses. Moreover, the SECONDARY ADDRESS is preferably calculated based on the input information before the issuance of the Multiway control signal. Thereafter, as in the example of the x-Multiway control signal above, issuance of the Multiway control signal causes the already-determined SECONDARY ADDRESS to load from COF instruction decode circuit 174 into the lower portion of address register 182x.

At this point, both the lower and upper portions of address register 182x are loaded with address portions. Those portions are then combined, preferably by concatenation, to form a single DESTINATION ADDRESS. This DESTINATION ADDRESS is the location within microROM 148 for proceeding with the execution of the COF instruction. Accordingly, the DESTINATION ADDRESS is coupled to microsequencer 146$x$ which selects it and couples it to microROM 148, thereby addressing and executing the next microinstruction of the execution stage for the COF instruction.

Note that the operation described in connection with the x-pipeline applies equally to the y-pipeline. Thus, at the same time that decode circuit 174 outputs it SECONDARY ADDRESS to the lower portion of address register 182$x$, the same SECONDARY ADDRESS is outputted to the lower portion of address register 182$y$. For the y-pipeline, a different BASE ADDRESS is provided from microROM 148, and this different BASE ADDRESS combines with the SECONDARY ADDRESS in the same manner, and for the same purpose, as described in connection with the x-pipeline. Similarly, the DONE signal, described in further detail below, is also coupled simultaneously from decode circuit 174 to both microsequencer 146$x$ and 146$y$.

From the above, it therefore should be appreciated that the embodiment of FIG. 8 removes the necessity to exhaust numerous conditional jumps, and resulting clock cycles, in advancing the execution of a COF or other condition dependent instruction. Particularly, the preferred embodiment requires only a single clock cycle, whereas the prior art required multiple clock cycles, to determine the destination address for executing the COF instruction. Naturally, therefore, throughput is enhanced, particularly with applications involving numerous COF instructions.

As described briefly above, the COF instruction decode circuit 174 may provide a DONE signal to the control input of microsequencer 146$x$ in lieu of providing the SECONDARY ADDRESS to address register 182$x$ as detailed above. This same functionality applies to the y-components and, hence, COF instruction decode circuit 174 may provide a DONE signal to cause control of microsequencer 146$y$ in lieu of providing the SECONDARY ADDRESS to address register 182$y$. This feature also provides advantages over the prior art.

Again, before detailing the DONE signal aspect of the present invention, a reminder of the known prior art technique for indicating the completion of execution of a COF or other condition dependent instruction is instructive. Recall from the description above that the known prior art methodology issued a DONE signal from the microROM. Typically, this occurred only after all other conditions in a sequence were tested, or after an alternative routine performed its steps and addressed the microROM so that it would issue a DONE signal. Moreover, the known prior art further required a one-clock advanced notice that the COF instruction was complete and, hence, two clock cycles were expended in providing an indication that execution of the COF instruction was DONE. In contrast, the present invention reduces the number of clock cycles in indicating a completion of the COF instruction. Accordingly, successive instructions may be advanced through the pipeline and, thus, throughput is enhanced.

The specific implementation of the DONE signal generation in accordance with the present invention is as follows. Again, the COF instruction decode circuit 174 operates independently of accesses to the microROM 148. Moreover, in the present embodiment, because of the input data available to the COF instruction decode circuit 174, it determines when a COF instruction has completed its execution stages. Thus, when the Multiway control signal is received by the COF instruction decode circuit 174, in lieu of a SECONDARY ADDRESS, it outputs a DONE signal if the combination of its inputs indicates completion of the execution of the COF instruction. In the preferred embodiment, the DONE signal is encoded in the same four bit output from decode circuit 174 discussed above in connection with the SECONDARY ADDRESS. Such a configuration permits dual use of the same conductors without an independent output. One skilled in the art, however, may readily appreciate that a separate output could be provided, with more or less bits, for communicating the DONE signal.

The DONE signal from the COF instruction decode circuit 174 is coupled to the microsequencer circuit 146 and controls the microsequencer circuit 146 such that the next microaddress it selects is the entry point microaddress to the instruction following the COF instruction. Accordingly, one skilled in the art may appreciate that the present invention immediately indicates the completion of the COF instruction without requiring the microROM to indicate such status. Thus, one or more clock cycles are saved over the known prior art embodiment described above.

Note that while the present invention has been described in detail, numerous alterations, modifications, or substitutions could be made hereto. For example, various techniques and/or architectures for calculating the SECONDARY ADDRESS and DONE signals are readily appreciated by a person skilled in the art, given an understanding of the specific microprocessor architecture, instruction set, and the need to jump to various different locations within microROM 148 based on the satisfaction of various conditions. Indeed, the input data to the decode circuit 174 may be altered to accommodate a change in the COF instruction set and/or the desired resultant address(es) based on those instructions and the conditions tested by such instructions. The same applies to the formation of the DONE signal. Moreover, as stated in numerous instances above, the present invention may also extend to conditional dependent instructions other than a COF instruction. Any derivations of these inputs or instructions, as well as other modifications or substitutions to the invention, should not affect the scope of the intended invention.

6. Microarchitecture Without Large PLA Decoder.

As discussed in connection with FIG. 4*a*, the preferred embodiment includes an instruction decoder 21 for receiving and decoding both the x- and y-machine instructions. After decoding a specific machine instruction, decoder 21 provides an entry point microaddress for the corresponding microinstruction(s) to the microsequencer circuit 146. Once selected by microsequencer circuit 146, the instruction entry point microaddress is provided to microROM 148 which decodes the entry point and outputs from its array 167 (FIG. 6) the microinstruction identified by the decoded entry point microaddress. The preferred implementation of the above-described process is devoid of large PLAs and as discussed immediately below, presents additional aspects of the present invention. While the discussion below uses the term microaddress, it should be understood that the generation of the microaddress described is limited in the preferred embodiment to the entry point microaddress, that is, the microaddress provided when a new instruction is to enter the EX stage.

Figure 9:
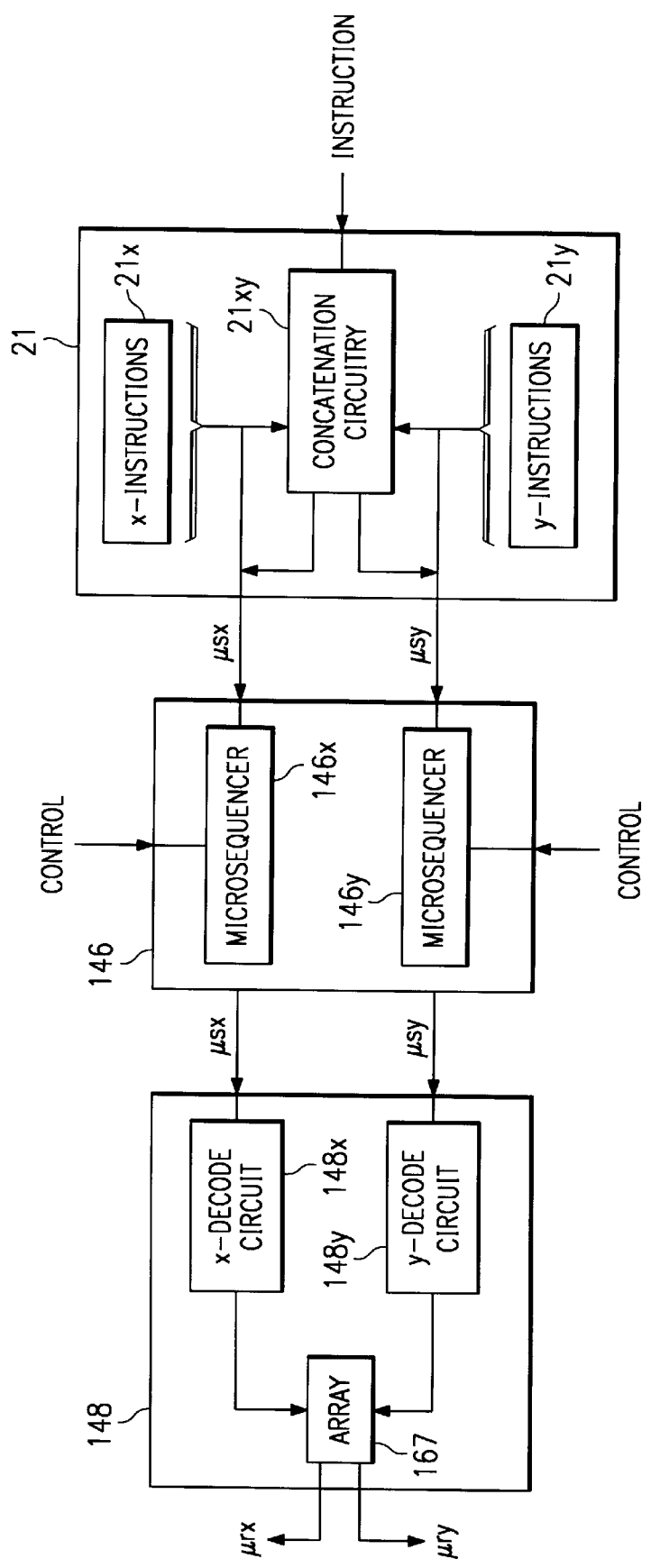
FIG. 9 illustrates a block diagram including an instruction decode block, a microsequencer circuit, concatenating microaddress generating circuitry, and a sparse microROM array, practiced in accordance with the principles of the present invention.

FIG. 9, in a manner similar to FIG. 4*a*, illustrates a simplified block diagram including instruction decoder 21, microsequencer circuit 146, and microROM 148 of the microprocessor. For purposes of ease of description, various features from FIG. 4a are removed while additional features are detailed. As to the additional details, decoder 21 includes individual registers 21x and 21y for receiving the x- and y-machine instructions, respectively. In addition, decoder 21 further includes concatenation circuitry 21xy for generating the microaddress as described in greater detail below. Although concatenation circuitry 21xy is shown as a separate component, it should be understood that the functions described below may be shared by other circuits which are used to perform other operations in the microprocessor.

MicroROM 148 includes decode circuits 148x and 148y for decoding x-and y-microaddresses, that is, addresses provided by microsequencer circuit 146 for addressing microinstructions stored in array 167 of microROM 148. More particularly, the x-microaddress is coupled to x-decode circuit 148x. The x-decode circuit 148x includes preprogrammed logic to decode the microaddress to form an array access signal. The array access signal accesses the particular microinstruction stored within array 167 and corresponding to the x-microaddress. Thus, after decoding the microaddress to an array access signal, the appropriate microinstruction is output in response to the x-microaddress.

6.1 Sparse MicroROM Array

Figure 10:
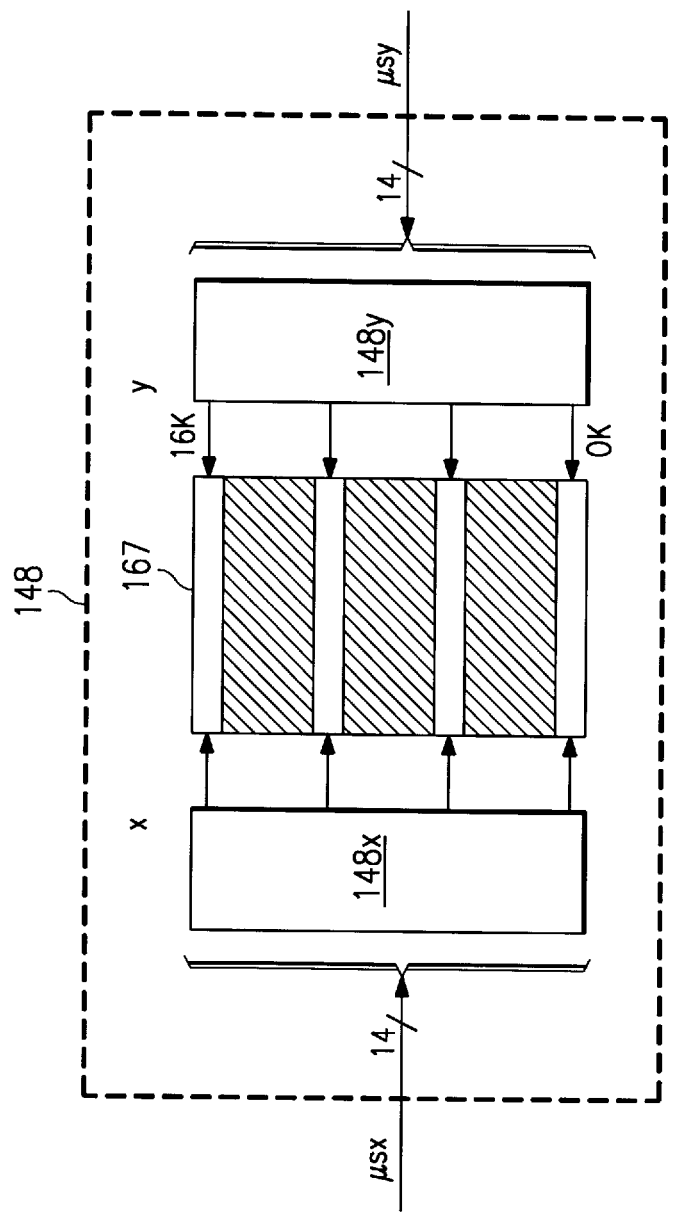
FIG. 10 illustrates a more detailed block diagram of the sparse microROM array practiced in accordance with the principles of the present invention.

Reference is now made to FIGS. 6 and 10 which illustrates a microROM 148 having a sparse array 167, practiced in accordance with the principles of the present invention. The fourteen bit microaddresses ($\mu$sx and $\mu$sy) of the preferred embodiment create a potential of 16,384 (i.e., $2^{14}$= 16,384) addressable locations. However, Applicants have found through simulation and experimentation that the X86 architecture requires far less than 16,384 microinstructions. Indeed, in the preferred embodiment, approximately 3,000 microinstructions are used to accommodate the machine instruction set. The sparse array 167 has 3,000 non-contiguous locations mapped over the 16,384 location address space and addressable by all 14 bits. The "voids" in the sparse array 167 are depicted in FIG. 10 as being cross hatched. Simply put, the actual microinstructions are stored between logical memory locations 0 and 16,384 while the sparse array 167 only has 3,000 logically non-contiguous but physically contiguous memory locations.

Decode circuits 148x and 148y receive unique 14-bit microaddresses ($\mu$sx and $\mu$sy) and output corresponding row and column array access signals from latches 158x and 158y and latches 162x and 162y respectively, to access logical memory locations between 0 and 16,384 in the 3,000 non-contiguous location sparse array 167 for the x and y-pipelines. Thus, while the microROM 148 may accept a microaddress capable of addressing 16,384 addresses, sparse array 167 is sized only to accommodate the significantly reduced number of locations (i.e. 3,000) actually necessary given the particular instruction/microinstruction set of the processor.

6.2 Address Entry Point Generation

The operation of the microaddressing function illustrated in FIG. 9 is best understood with further reference to FIGS. 11–15. Machine instructions are received, decoded, and a corresponding entry point microaddress is calculated in the same manner for either the x- or y-instruction. Thus, for explanation purposes, the following discussion relates to the x-machine instruction, with it understood that the same principles apply equally to the y-machine instruction. The x-machine instruction is first received in the corresponding register 21x. The present invention is preferably based on a variable size instruction set and, thus, the number of bits in the machine instruction varies. Thereafter, selected bits from the machine instruction stored in register 21x are concatenated to form a second portion of the $\mu$sx (x- entry point microaddress). A third and fourth portion of the $\mu$sx are derived from operations performed by concatenation circuitry 21xy based on various considerations described below. For each of the three portions of the microaddress, the particular bits are chosen or generated to present a series of combined bits (an address) which uniquely identify the appropriate entry point microinstruction stored in sparse array 167 to thereby begin the execution of the instruction stored in register 21x.

The four portions of bits are combined in the following sequence to form $\mu$sx:

$$\{\text{fourth,third,second,first}\} \qquad \text{Eqn. 1}$$

Commas in Eqn. 1 indicate that the portions are concatenated together in the order shown. The combined portions forming $\mu$sx is then selected by microsequencer 146x in a manner as described above, and coupled to microROM 148 for addressing the sparse array 167.

As set forth in section 6.1 above, the preferred embodiment uses a microaddress ($\mu$sx) of fourteen bits. Given the four portions of the $\mu$sx, note that the preferred embodiment implements eleven concatenated bits (i.e., the second portion), two logically derived bits (i.e., the third and fourth portions), and one timing bit 223 (i.e., the first portion). The specific methodology for establishing each of these four portions is described immediately below.

The first portion of the microaddress is the least significant bit of the microaddress, and for purposes of timing, is appended to the remaining thirteen bits described below. Particularly, in the preferred embodiment, and for instructions requiring more than one clock to execute (as opposed to single clock instructions discussed in Section 3, above), it is recognized that the output of the sparse array 167 may not be available by the immediate clock cycle following the generation of the entry point microaddress. In other words, if the executing machine instruction requires more than one clock cycle to execute, a successive microaddress following the entry point microaddress is required, but may not be output from array 167 by the immediate next clock cycle. Consequently, the first portion bit is a binary 0 added as the least significant bit to the remaining thirteen bits, thereby rendering the entire address as an even number. Moreover, the successive microaddress following the entry point microaddress is established so that it is the odd address immediately following the even entry point microaddress.

As an example of the first portion, assume the thirteen bits before adding the first portion represents a 200 (hexadecimal). The first portion adds a binary zero to the hexadecimal 200, yielding an entry point microaddress of 400 (hexadecimal). Thus, the microinstruction located in array 167 at address 400 (hexadecimal) is accessed. In the meantime, during the next clock cycle, the next microaddress provided to microsequencer circuit 146 is 401 (hexadecimal), that is, the odd address immediately following the even entry point microaddress of 400.

Figure 11:
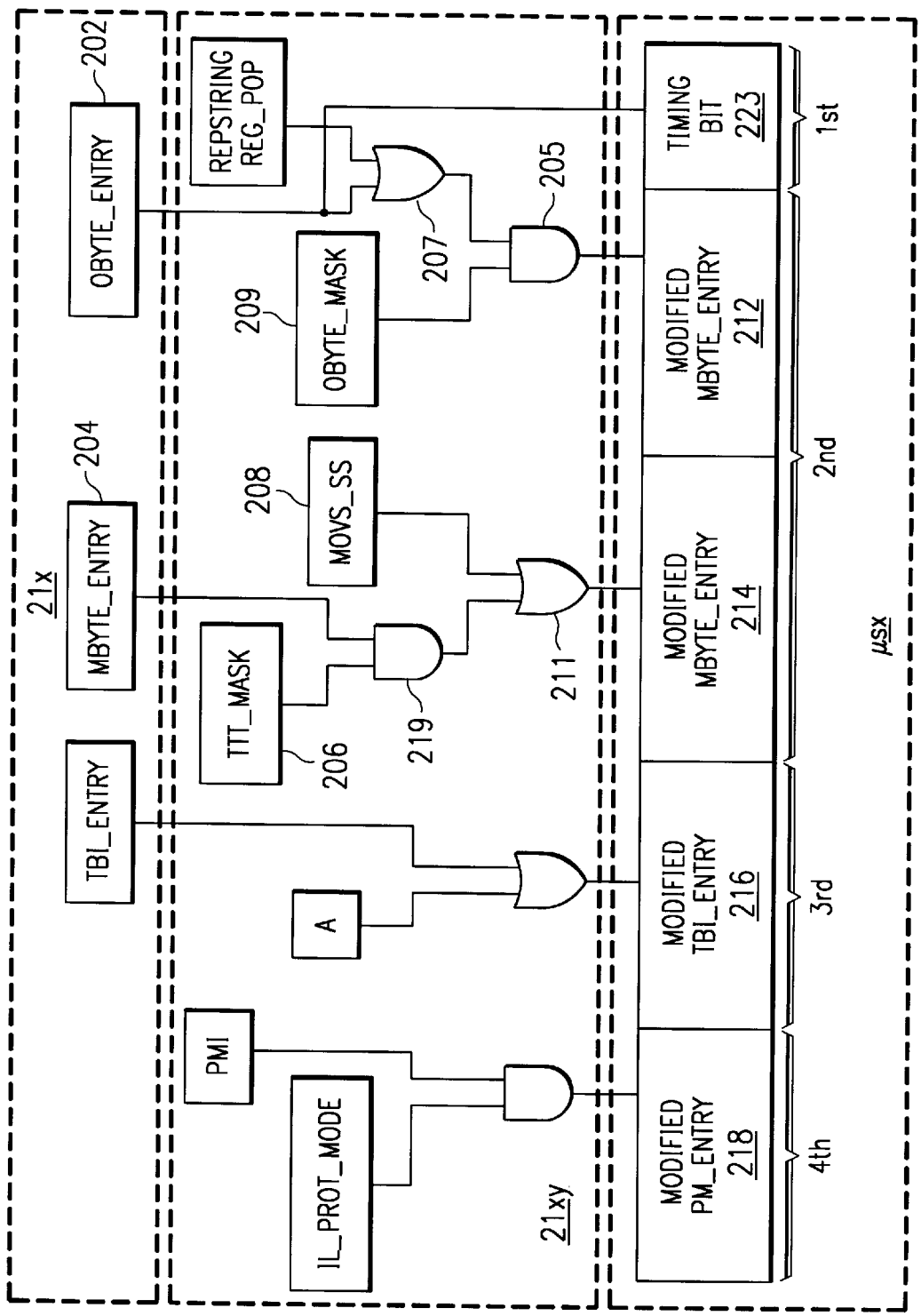
FIG. 11 illustrates a block diagram of the concatenation circuitry practiced in accordance with the principles of the present invention, for generating an entry point into the sparse microROM array without the use of a PLA.
Figure 12:
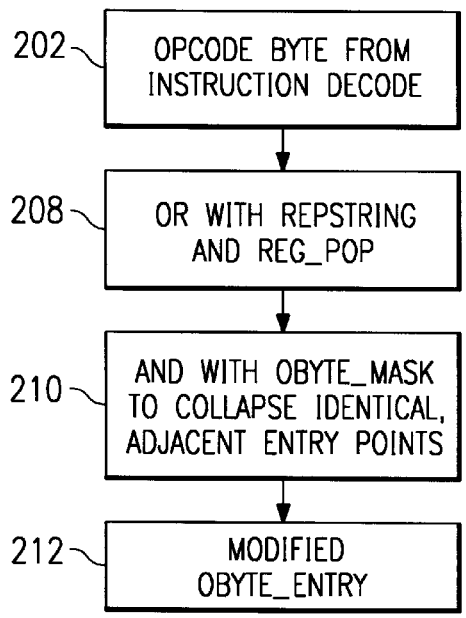
FIG. 12 illustrates a specific process diagram for generating the modified obyte_entry in FIG. 11.
Figure 13:
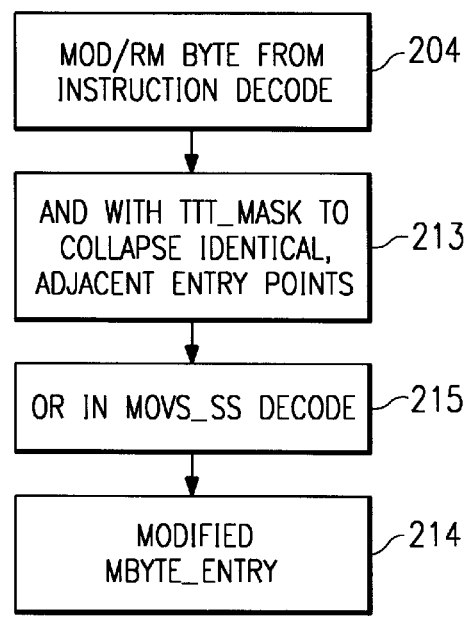
FIG. 13 illustrates a specific process diagram for generating the modified mbyte_entry in FIG. 11.

As best seen in FIGS. 11–13, the second portion of the microaddress is generally created by concatenating eleven modified bits from the machine instruction in register 21x. In the preferred embodiment of the X86 architecture, the second microaddress portion is defined as follows:

$$\text{second portion} = \{\text{modified mbyte\_entry,} \\ \text{modified obyte\_entry}\} \qquad \text{Eqn. 2}$$

In general, obyte_entry 202 relates to the opcode field of the particular machine instruction. Note that the X86 instruction set permits both one and two byte opcode machine instructions. The first byte in a two byte machine instruction is defined as 0F (hexadecimal) and, thus, once the 0F is detected, it is known that the instruction is a two opcode instruction. For purposes of Eqn. 2, obyte_entry 202 is derived from the sole opcode byte in a one opcode byte machine instruction, and the second opcode byte in a two opcode machine instruction.

Also, mbyte_entry 204 generally relates to bits [5:3] of the mod/rm byte which is known to one skilled in the X86 architecture, and generally provides information concerning a machine instruction's mode of addressing, that is, whether the machine instruction relates to register addressing or memory addressing, although in some instances, depending on the machine instruction, it may be effectively part of the opcode instruction.

With specific reference to FIGS. 11 and 12, modified obyte_entry 212 is defined as follows:

$$\text{modified obyte\_entry} = (\text{obyte} \mid \{11'\text{b}0, \text{repstring}, 5'\text{b}0, \text{reg\_pop}\}) \\ \& \text{ obyte\_mask} \qquad \text{Eqn. 3}$$

wherein:

obyte is the sole opcode byte in a one opcode byte machine instruction, and the second opcode byte in a two opcode machine instruction;

repstring is a one bit field indicating binary 1 only if the particular machine instruction has a repeat until zero or repeat until not zero prefix, wherein such prefixes are known in the X86 art;

reg_pop is a one bit field indicating a binary 1 only if the particular instruction is a "pop" instruction which uses register addressing; and obyte_mask is a generated mask described in more detail hereinbelow.

For purposes of convention, the symbol "&" is used to indicate a bit-by-bit AND operation, such as by an array of AND gates 205 and "|" is used to indicate a bit-by-bit OR operation, such as by an array of OR gates 207. Note also that the symbols "11'b0" and "5'b0" indicate eleven and five binary bits of a logical zero, respectively. The comma between terms indicates that the two quantities are concatenated together. Thus as illustrated in FIG. 12, step 208, the obyte_entry 202 is logically Ored bit-by-bit with repstring and reg_pop, the result being bitwise logically ANDed with obyte_mask 209 at step 210, to form a modified obyte_entry 212.

Similarly, a modified mbyte_entry 214 is defined as follows:

$$\text{modified mbyte\_entry} = (\text{mbyte}[5:3] \& \text{ttt\_mask}) \mid (2'\text{b}0, \text{movs\_ss}) \qquad \text{Eqn. 4}$$

wherein:

mbyte[5:3] refers to bits [5:3] of the mod/rm byte which are discussed in connection with Eqn. 2, above;

ttt_mask 206 is a mask chosen to selectively mask the mbyte[5:3] bits to collapse like machine instructions into a single microaddress entry point to avoid duplicative entry points for identical micro-sequences; and, movs_ss 208 is a semaphore generated by circuitry 21XY which identifies as described in more detail below, a move to the stack segment register.

As best illustrated in FIGS. 11 and 13, the three bit quantity mbyte_entry 204 is bitwise ANDed with an array of AND gates 219 to a three bit quantity ttt_mask 206 (step 213), and the result is bitwise ORed with an array of OR gates 211 (step 215) to the two binary zeroes concatenated with movs_ss 208. Each of the variables of Eqn. 4 is defined below.

$$\text{movs\_ss} = (\text{il\_prot\_mode}) \text{ AND } (!\text{tbi}) \text{ AND } (\text{obyte}[7:0] == 8'\text{h}8\text{e}) \\ \text{AND } (\text{mbyte}[5:3] == 3'\text{b}010) \qquad \text{Eqn. 5}$$

For purposes of convention, note the symbol "!" indicates the logical NOT function, and the symbol "==" queries whether two parameters equal one another, returning a binary 1 if matching and a binary 0 if not. Further, the convention "8'h8e" indicates eight bits in hexadecimal (i.e., "8'h"), and the bits are the hexadecimal values following the "8'h"(thus, 8e in Eqn. 5). Each of the variables of Eqn. 5 is defined below.

il_prot_mode is a single bit indicating the status of the protected mode. The protected mode is one of three known modes for operating an X86 microprocessor. This mode is set by a given instruction, and remains set (i.e., typically through some flag or register bit) until any subsequent instruction changes the mode (to either real mode or virtual 86 mode);

tbi is a binary 1 if the instruction is a two opcode instruction, and a binary 0 if the instruction is a one opcode instruction. The overall combination of (!tbi) AND (obyte[7:0]==8'h8e) maps a register or memory operation to the segment register; and (mbyte[5:3]==3'b010) checks whether the destination is the stack segment.

The present invention overcomes the limitation of requiring a separate entry point within array 167 for each decoded machine instruction by selectively modifying the bit sequence. For example, the X86 machine instruction set includes various different ADD machine instructions, where such ADD machine instruction differs only in the source of the data to be added. The present invention recognizes that these type of machine instructions may commence operation using the same particular microinstruction. Consequently, the bit sequences derived for each of these instructions are further modified using obyte_mask 209 so that each addresses the same location within array 167. This additional modification is described below.

To perform the masking function of obyte_mask 209, concatenation circuitry 21xy detects those machine instructions which may execute using the same first microinstruction. Once so detected, concatenation circuitry 21xy provides the appropriate value of obyte_mask 209 to include zeroes at selected locations so that the bitwise AND of Eqn. 3 masks those machine instructions to the same address. Note that addressing a sole array location based on differing machine instructions reduces or eliminates duplicate microinstructions within the array and, hence, leaves other locations free to store different microinstructions. Consequently, the size of array 167 is minimized, again reducing power and cost, and increasing overall microprocessor speed.

Figure 14:
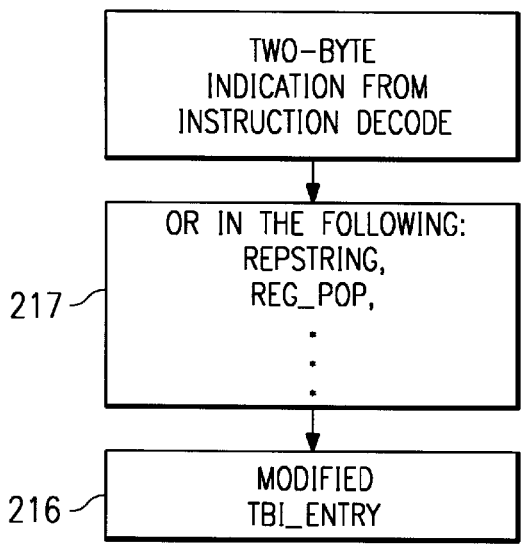
FIG. 14 illustrates a specific process diagram for generating the modified tbi_entry in FIG. 11; and, FIG. 15 illustrates a specific process diagram for generating the modified pm_entry in FIG. 11.

Returning to Eqn. 1 and FIG. 14, the third portion of the microaddress is created using concatenation circuitry 21xy to logically evaluate various machine instruction bits to derive a single bit. In the preferred embodiment of the X86 architecture, the third portion is defined as follows:

$$\text{third portion} = \{\text{modified tbi\_entry}\} \qquad \text{Eqn. 6}$$

where modified tbientry is defined as follows and depicted as step 217 in FIG. 14:

$$\text{modified tbi\_entry} = \text{tbi OR A} \qquad \text{Eqn. 7}$$

A= repstring OR reg_fop OR reg_movs OR reg_push OR reg_pop OR reg_cof

Thus, Eqn. 7 and FIG. 14 illustrate that seven different terms are each logically ORed with one another and, thus, the third microaddress portion is a logical one if any of those terms is a logical one. The purpose of the third portion is to map to a different microaddress (and microinstruction) depending on the type of machine instruction and/or its addressing function. Thus, the seven terms of Eqn. 7 relate to machine instruction type or addressing, and depending on any one of those terms, toggle the value of the third portion which consists of a single bit. Each of the variables of Eqn. 7 are defined below.

tbi is defined above in connection with Eqn. 5;

repstring is defined above in connection with Eqn. 3;

reg_xxxx: each of the remaining "A" terms are designated with "reg_" followed by an abbreviation relating to their respective functionality. Each of the reg_xxxx terms are derived by evaluating the machine instruction mod/rm byte. The "reg_" designation indicates that the particular machine instruction involves a register, as opposed to memory, operation. Typically, register operations may be executed in fewer clock cycles as compared to their memory counterparts; thus, it is beneficial to address a different microinstruction depending on whether register or memory addressing is involved. The specific functionality of the "reg_xxx" terms is as follows:

reg_fop is a binary 1 only if the particular machine instruction is a floating point instruction using register addressing;

reg_movs is a binary 1 only if the particular machine instruction moves to the stack segment using register addressing;

reg_push is a binary 1 only if the particular machine instruction pushes to the stack register using register addressing;

reg_pop is a binary 1 only if the particular machine instruction pops from the stack register using register addressing; and reg_cof is a binary 1 only if the particular machine instruction involves a call or jump using indirect addressing.

Figure 15:
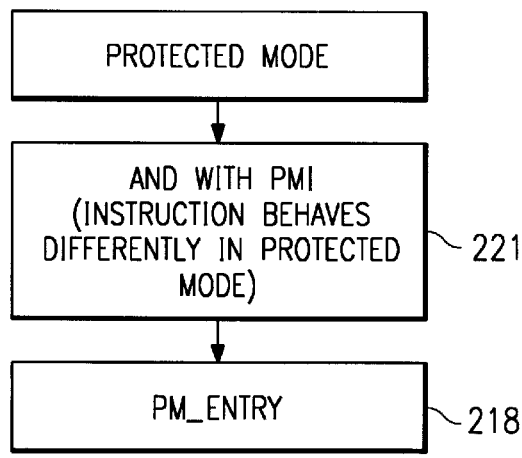

The fourth portion of the microaddress, best illustrated in FIGS. 11 and 15, is defined as follows:

$$\text{fourth portion} = \{pm\_entry\} \qquad \text{Eqn. 8}$$

where pm_entry is defined as follows:

$$pm\_entry = il\_prot\_mode \text{ AND } pmi \qquad \text{Eqn. 9}$$

Thus, Eqn. 9 and step 221 in FIG. 15 illustrate that the fourth portion derives by evaluating whether the processor is in the protected mode and the term pmi. il_prot_mode is defined above in connection with Eqn. 5; and pmi is an arbitrary term used under the present invention for various predetermined machine instructions. Particularly, the present invention utilizes different microinstructions corresponding to those predetermined machine instructions which execute less efficiently (i.e. more microinstructions are needed) when the processor is operating in the protected mode. For example, it has been determined that FAR jumps or segment loads may be executed using more microinstructions when executing in the protected mode. Thus, pmi is a binary 1 for the FAR jump or segment load instruction, thereby creating a different entry point microaddress for these types of predetermined machine instructions. As a contrary example, ADD machine instructions operate with like efficiency irrespective of the processor being in protected mode. Thus, pmi is a binary 0 for the ADD machine instruction. Note that the particular machine instructions which benefit are detected by the bits of their opcode, their mod/irm bytes, and the associated tbi value defined above. In the preferred embodiment, a PLA is implemented to evaluate these three parameters, and output the appropriate value for pmi.

The above, therefore, describes numerous microaddressing aspects of the present invention. Each of the aspects above act, either in part or in combination, to provide a fast and efficient manner of generating a microaddress with a minimal amount of hardware and complexity and, thus, reduced power consumption, die area, and cost. Moreover, the addressing is used in conjunction with an microROM array providing like benefits. Note also that the microaddressing concept of the present invention is not necessarily limited to the preferred configuration described in section 4, above. Recall, section 4 describes, and FIG. 6 illustrates, a configuration where numerous microinstructions are stored in a single row of array 167. Consequently, the microaddress is reduced to row and column accessing signals, with each individually decoded such that a row is first selected, and a particular column is then selected from the chosen row. Alternatively, however, the concatenating address scheme and reduced array size of the present invention are also applicable to arrays having a one-instruction per row format.

7. Conclusion.

Note that although the preferred embodiment has been disclosed, various alternatives may be made by a person skilled in the art without departing from the invention as claimed. Numerous examples of such alternatives have been set forth throughout. As another example, while block diagrams have been shown herein, it should be understood that such blocks represent the methodology of the invention and, thus, do not necessarily limit its scope; hence, various functions may be moved to other defined areas of the microprocessor without necessarily departing from the scope of the invention. As yet a final example, while the architecture and timing diagrams involve a dual-pipeline scenario, various aspects of the present invention may be applied to a single pipeline, or other multiple-pipeline, processor architecture. The invention encompasses any modifications or alternative embodiments that fall within the scope of the claims.

What is claimed is:

1. A complex instruction set computer having condensed microaddress generation responsive to execution of a machine instruction, comprising:

(a) a sparse microROM array having an M-bit noncontigious address space; and, (b) N-bit addressing means for addressing the sparse microROM array responsive to the machine instruction, wherein N is larger than M and wherein the N-bit addressing means forms an entry point microaddress into the sparse microROM array by concatenating a plurality of selected portions of the machine instruction wherein one of the plurality of selected portions of the machine instruction is logically bitwise ANDed with a predetermined mask to collapse like machine instructions into a single entry point microaddress.

2. A complex instruction set computer having condensed microaddress generation responsive to execution of a machine instruction, comprising:

(a) a sparse microROM array having an M-bit noncontigious address space: and, (b) N-bit addressing means for addressing the sparse microROM array responsive to the machine instruction, wherein N is larger than M and wherein the N-bit addressing means forms an entry point microaddress into the sparse microROM array by concatenating a plurality of selected portions of the machine instruction wherein one of the plurality of selected portions of the machine instruction is logically bitwise ORed with a predetermined mask to collapse like machine instruction into a single entry point microaddress.

3. A complex instruction set computer as recited in claims 1 or 2 wherein the N-bit addressing means addresses the sparse array for at least two execution pipelines.

4. In a complex instruction computer system, a microarchitecture comprising:
   (a) M-bit sparse array means for storing microcode sequences defining a machine instruction in noncontigious address space; and,
   (b) N-bit addressing means for addressing the M-bit sparse array means, wherein N is larger than M and the N-bit addressing means forms an entry point microaddress into the M-bit sparse array means by concatenating selected portions of the machine instruction; and,
   (c) means for logically bitwise ANDing one of the plurality of selected portions of the machine instruction with a predetermined mask to collapse like machine instructions into a single entry point microaddress.

5. In a complex instruction computer system, a microarchitecture comprising:
   (a) M-bit sparse array means for storing microcode sequences defining a machine instruction in noncontigious address space;
   (b) N-bit addressing means for addressing the M-bit sparse array means, wherein N is larger than M and the N-bit addressing means forms an entry point microaddress into the M-bit sparse array means by concatenating selected portions of the machine instruction; and,
   (c) means for logically bitwise ORing one of the plurality of selected portions of the machine instruction with a predetermined mask to collapse like machine instructions into a single entry point microaddress.

6. A microarchitecture as recited in claims 4 or 5 wherein the N-bit addressing means (b) addresses the M-bit sparse array means for at least two execution pipelines.

7. A method of interpreting machine instructions in a complex instruction computer system comprising the steps of:
   (a) storing at least one microcode sequence defining at least one machine instruction in a microROM having noncontigious address space; and,
   (b) addressing the microROM by concatenating a plurality of selective portions of the machine instruction to form an entry point address wherein one of the plurality of selected portions of the machine instruction is logically ANDed bitwise with a predetermined mask to collapse like machine instructions into a single entry point microaddress.

8. A method of interpreting machine instructions in a complex instruction computer system comprising the steps of:
   (a) storing at least one microcode sequence defining at least one machine instruction in a microROM having noncontigious address space; and,
   (b) addressing the microROM by concatenating a plurality of selective portions of the machine instruction to form an entry point address wherein one of the plurality of selected portions of the machine instruction is logically ORed bitwise with a predetermined mask to collapse like machine instructions into a single entry point rnicroaddress.

* * * * *